United States Patent [19]
Fuji

[11] Patent Number: 5,311,493
[45] Date of Patent: May 10, 1994

[54] DATA REPRODUCTION CIRCUIT FOR CONVERTING A READ ANALOG SIGNAL

[75] Inventor: Hiroshi Fuji, Nara, Japan

[73] Assignee: Sharp Kabushiki Kaisha, Osaka, Japan

[21] Appl. No.: 680,232

[22] Filed: Apr. 3, 1991

[30] Foreign Application Priority Data

Apr. 6, 1990 [JP] Japan .................. 2-92577

[51] Int. Cl.[5] .............................................. G11B 7/00
[52] U.S. Cl. ........................................ 369/59; 369/48; 369/124; 360/41
[58] Field of Search ................. 369/59, 50, 54, 58, 369/47, 48, 49, 32, 44.25, 33, 124; 360/32, 39, 41, 48

[56] References Cited

U.S. PATENT DOCUMENTS

| | | | |
|---|---|---|---|
| 4,755,950 | 7/1988 | Yoshimaru et al. | 369/44.25 |
| 4,954,903 | 9/1990 | Fuji et al. | |

FOREIGN PATENT DOCUMENTS

| | | |
|---|---|---|
| 0084358 | 7/1983 | European Pat. Off. |
| 0312214 | 4/1989 | European Pat. Off. |
| 57-150119 | 9/1982 | Japan |
| 57-201323 | 12/1982 | Japan |
| 61-284876 | 12/1986 | Japan |
| 63-070969 | 3/1988 | Japan |
| 64-79973 | 3/1989 | Japan |
| 113658 | 3/1989 | Japan |
| 1112569 | 5/1989 | Japan |
| 1134704 | 5/1989 | Japan |

Primary Examiner—W. R. Young
Assistant Examiner—Muhammad Edun

[57] ABSTRACT

A data reproduction circuit for converting a read analog signal into digital data corresponding to recording data, has a second order differential circuit for emitting a second order differentiated signal of the read analog signal read from a data recording medium, an inverter for generating a comparative voltage that is switched between a plurality of levels, and a comparator for comparing the second order differentiated signal and the comparative voltage to release digital data. This permits to cancel a DC component of the read analog signal and to adopt a 2,7NRZI method for recording and reproduction enabling to achieve a high recording density. The circuit further comprises a peak detecting circuit for detecting and converting a peak of the read analog signal into digital data, and that has a first order differential circuit for emitting a first order differentiated signal of the read analog signal, a three-state inverter for generating a second comparative voltage that is switched between a plurality of levels, and a comparator for comparing the first order differentiated signal and the second comparative voltage to release digital data. The circuit may thus be adopted for both RZ and NRZI methods.

14 Claims, 20 Drawing Sheets

(a) RECORDING MAGNETIC FILM
(b) RECORDING SIGNAL A
(c) MODULATED BITS
(d) READ ANALOG SIGNAL B

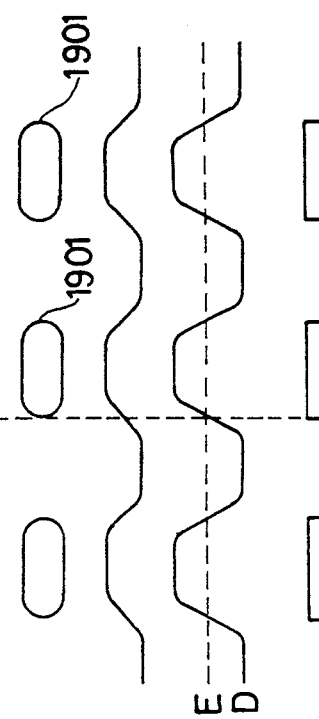
FIG. 19 PRIOR ART
FIG. 20 PRIOR ART (a) RECORDING BITS
(b) RECORDING MARKS
(c) READ ANALOG SIGNAL B
(d) FIRST ORDER DIFFERENTIATED SIGNAL F
(e) DIGITAL DATA C
(f) REPRODUCTION BITS

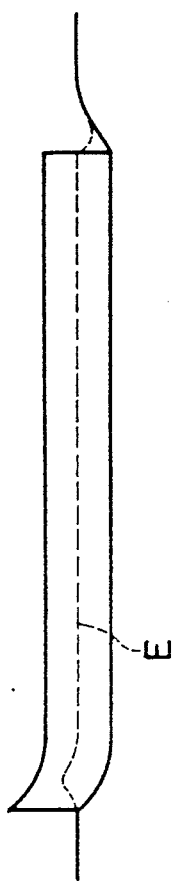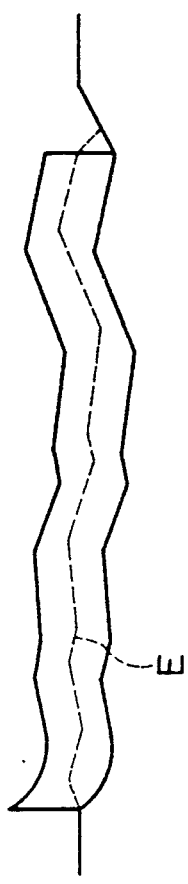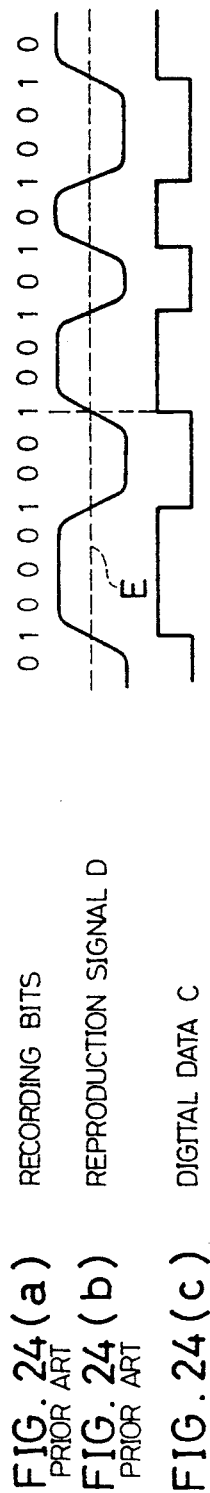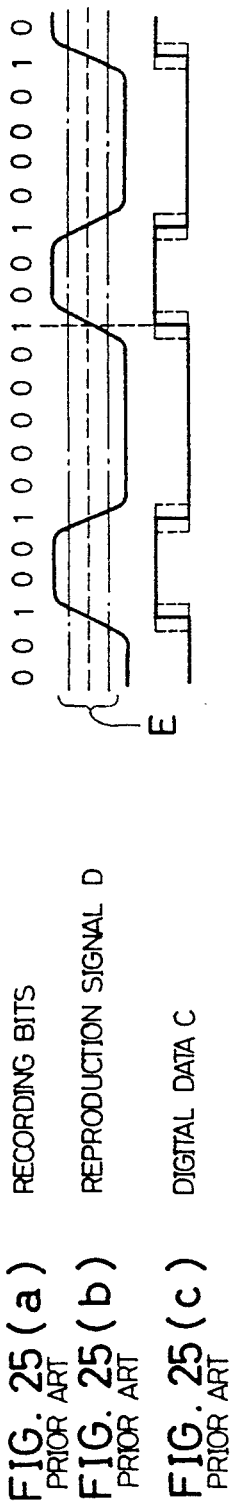
FIG. 23(a) PRIOR ART  REPRODUCTION SIGNAL D
FIG. 23(b) PRIOR ART  REPRODUCTION SIGNAL D
FIG. 24(a) PRIOR ART  RECORDING BITS
FIG. 24(b) PRIOR ART  REPRODUCTION SIGNAL D
FIG. 24(c) PRIOR ART  DIGITAL DATA C
FIG. 25(a) PRIOR ART  RECORDING BITS
FIG. 25(b) PRIOR ART  REPRODUCTION SIGNAL D
FIG. 25(c) PRIOR ART  DIGITAL DATA C

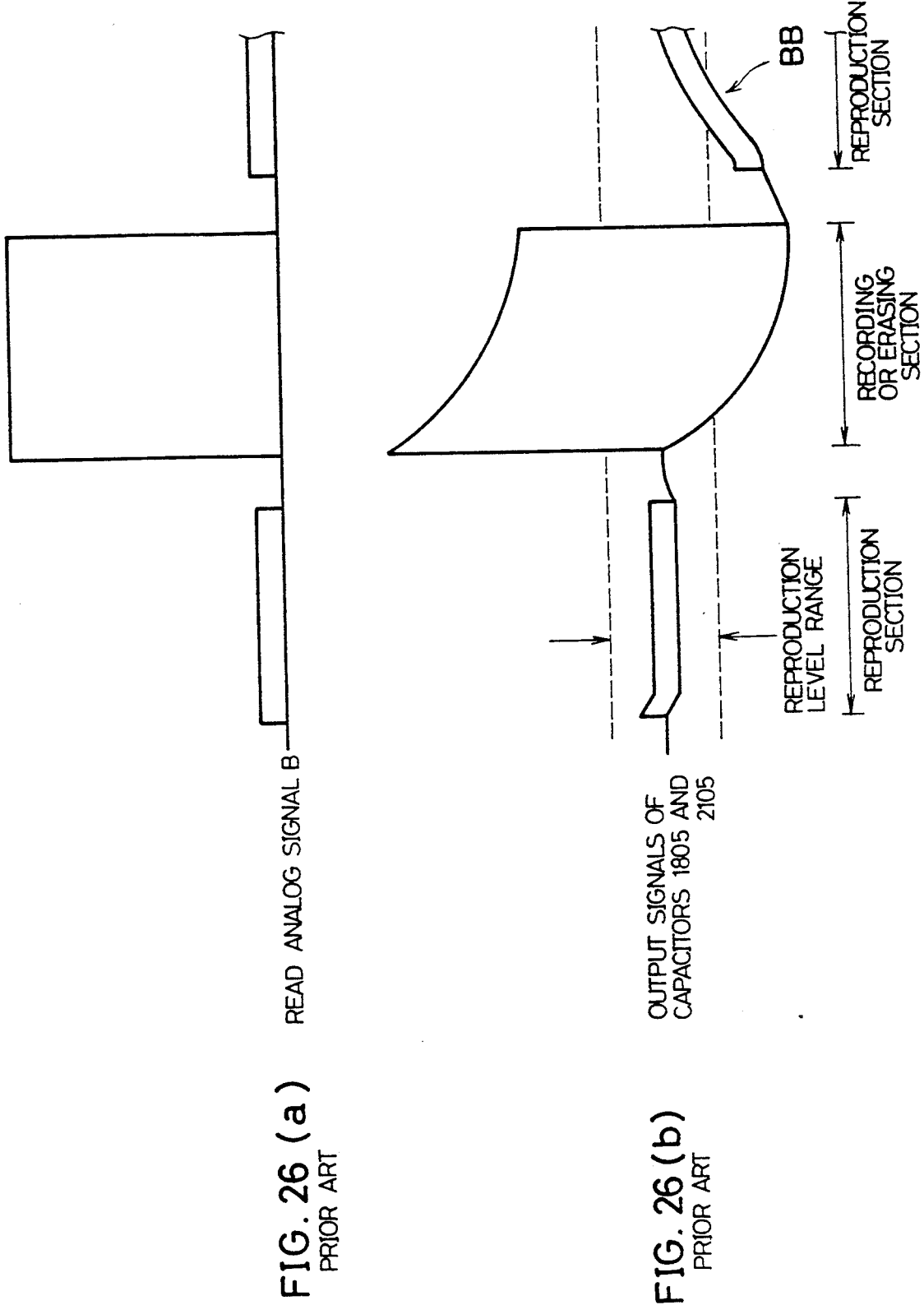

DATA REPRODUCTION CIRCUIT FOR CONVERTING A READ ANALOG SIGNAL

BACKGROUND OF THE INVENTION

1. Field of the Invention

The present invention relates to a data reproduction circuit for use in a data recording/reproduction apparatus. More specifically, the present invention relates to a data reproduction circuit for converting a read analog signal that was read from a magneto-optical disk or other medium by means of an optical head, into the original digital data.

2. Description of Prior Art

An example of data recording/reproduction apparatus, here a recording/reproduction apparatus for magneto-optical disk shown in FIG. 16, will be described hereinbelow.

A magneto-optical disk 1601 has a magnetic thin film as a recording medium on the surface of the disk which has a magnetic anisotropy such that the axis of easy magnetization is oriented vertical to the surface of the film. A laser beam 1602 is irradiated from an optical head 1603 onto the magnetic thin film. Due to this irradiation, the temperature of the irradiated spot is raised locally to decrease the coercive force Therefore, when a biased magnetic field is applied to the spot from a magnetic head 1604, the magnetization of the spot is inverted Here, the biased magnetic field may be applied only to the spot to be recorded, or may be preliminarily applied prior to the recording operation. If the direction and strength of the magnetic field applied from the magnetic head 1604, or the strength of the laser beam 1602 is controlled according to recording signals A sent from a modulation circuit 1605, digital data is magnetically recorded in a vertical direction as dots having a diameter of the laser beam 1602. When erasing recorded data, a magnetic field having a direction opposite to that adopted for the recording is applied.

Upon reproducing data recorded as described above, a laser beam 1602 weaker than that adopted for recording and erasing is irradiated onto the magnetic thin film of the magneto-optical disk 1601. The linearly polarized laser beam 1602 is reflected to have a polarization plane inclined according to the magnetized state of the magnetic thin film by the magneto-optical effect (Faraday effect or Kerr effect). Therefore, the inclination of the polarization plane of the reflected light is converted through an analyzer into an electrical signal by an optical detector housed in the optical head 1603 whereby a read analog signal B may be obtained The read analog signal B is transmitted to a data reproduction circuit 1606 where it is converted into digital data C. The digital data C then passes through a PLL (Phase Locked Loop) 1607 and is demodulated in a demodulation circuit 1608. Modulation and demodulation are respectively performed in the modulation circuit 1605 and the demodulation circuit 1608 according to, for example, a modulation/demodulation method adopting the well-known 2,7 RLL code illustrated in Table 1. The 8/10 GCR code is also widely adopted.

TABLE 1

| (2,7 RLL code) | |
|---|---|
| Input bits | Modulated bits |
| 10 | 0100 |
| 010 | 100100 |
| 0010 | 00100100 |
| 11 | 1000 |
| 011 | 001000 |
| 0011 | 00001000 |
| 000 | 000100 |

A conventional data reproduction circuit will be described referring to FIGS. 17 to 26. FIGS. 17 to 19 illustrate a data reproduction circuit designed for an NRZI recording method while FIGS. 20 to 22 illustrate a data reproduction circuit designed for an RZ recording method.

A waveform of the read analog signal B (FIG. 17(d)) produced when the NRZI recording method is adopted is shown in FIG. 17. Modulated bits (FIG. 17(c)) are recorded onto a recording magnetic film 1701 (FIG. 17(a)) adopted as the magnetic thin film mentioned earlier, based on the recording signal A (FIG. 17(b)) and using the laser beam 1602 and the external magnetic field. The read analog signal B generated from the recording signal A is such that the leading and trailing edges thereof correspond to "1" of the modulated bits.

The conventional data reproduction circuit 1606 designed for the NZRI recording method will be discussed with reference to FIG. 18.

The read analog signal B is fed into an amplifier 1801 via a capacitor 1805. Interference in the waveform is then compensated for and S/N is improved in an equalizer and LPF (low-pass filter) 1802, and a reproduction signal D is sent to a non-inverted input terminal of a comparator 1803 and to an envelope detecting circuit 1804. The envelope detecting circuit 1804 emits a comparative voltage E corresponding to the center level of the envelope of the reproduction signal D to be sent to an inverted input terminal of the comparator 1803. The reproduction signal D and the comparative voltage E are compared in the comparator 1803 that releases digital data C.

FIG. 19 illustrates waveforms produced in the different sections shown in FIG. 18. With the NRZI recording/reproduction method, the leading and trailing edges of a recording mark 1901 (FIG. 19(b)) respectively coincide with a recording bit (FIG. 19(a)) "1". The read analog signal B (FIG. 19(c)) is produced by reading the recording marks 1901 by means of the optical head 1603.

The reproduction signal D is fed into the non-inverted input terminal of the comparator 1803. On the other hand, the comparative voltage E fed into the inverted input terminal of the comparator 1803 corresponds to the center level of the envelope of the reproduction signal D (FIG. 19(d)). Therefore, reproduction bits (FIG. 19(f)) coinciding with the recording bits may be obtained by having "1" correspond to the inverting positions of the digital data C (FIG. 19(e)) released from the comparator 1803.

The read analog signal B obtained when the RZ recording method is adopted, will be discussed now with reference to FIG. 20.

Modulated bits (FIG. 20(c)) are recorded upon the recording magnetic film 1701 (FIG. 20(a)) based on the recording signal A (FIG. 20(b)) by means of the laser beam 1602 and the external magnetic field. The difference with the recording NRZI method lies in the fact that, here, each peak of the read analog signal B (FIG. 20(d)) corresponds to the modulated bit "1".

A conventional data reproduction circuit designed for the RZ recording method will be discussed hereinbelow with reference to FIG. 21. The read analog signal B is fed into an amplifier 2101 via a capacitor 2105. Interference in the waveform is then compensated for and S/N is improved in an equalizer and LPF 2102. A first order differentiated signal F is sent via a differential circuit 2103 to a hysteresis comparator 2104 that releases digital data C.

FIG. 22 illustrates waveforms obtained with the configuration shown in FIG. 21.

With the RZ recording/reproduction method, each recording bit "1" (FIG. 22(a)) coincides with the center of a recording mark 2201 (FIG. 22(b)). The read analog signal B (FIG. 22(c)) may be obtained by reading the recording marks 2201 by means of the optical head 1603 The digital data C (FIG. 22(e)) is inverted as the first order differentiated signal F (FIG. 22(d)) fed into the hysteresis comparator 2104, goes beyond hysteresis levels $Th_1$ and $Th_2$. Therefore, reproduction bits (FIG. 22(f)) slightly lagging behind the recording bits may be obtained by having "1" correspond to the falling edges of the digital data C released from the hysteresis comparator 2104.

Lately, the development of magneto-optical recording/reproduction apparatuses has been actively pursued and high recording density together with high speed are demanded. Magneto-optical recording/reproduction apparatuses employing various modulation methods or recording/reproduction methods have been investigated and developed to meet this demand. However, the conventional data reproduction circuits discussed above suffer from the drawbacks that (1) high recording density, (2) compatibility, and (3) high speed are difficult to achieve. This will be covered hereinbelow.

(1) Difficulty to Obtain a High Recording Density

Compared to the RZ method, the NRZI method still allows to raise the bit density (to achieve a high recording density). This can be seen by comparing the recording marks 1901 shown in FIG. 19 (NRZI method) and the recording marks 2201 shown in FIG. 22 (RZ method) corresponding to the same recording bits (or reproduction bits). Additionally, it is well known that the use of the 2,7 RLL code permits achievement of a higher bit density than the 8/10 GCR code. The 2,7NRZI method, i.e., a combination of the NRZI method and 2,7RLL code, can thus be cited as example of a method enabling a high recording density. However, the 2,7NRZI method presents the following drawbacks.

Namely, FIG. 23 illustrates the waveforms of the envelopes of the reproduction signals D respectively produced when recording with the 8/10NRZI method, i.e., a combination of the 8/10 GCR code and NRZI method, (FIG. 23(a)), and when recording with the 2,7NRZI method (FIG. 23(b)).

As can be observed in the figure, compared to the waveform obtained with the 8/10NRZI method, the waveform obtained with the 2,7NRZI method shows a strong vertical fluctuation. This is due to the fact that, whereas a DC component included in a 8/10NRZI recording bit is greatly restrained (DC free), the DC component included in a 2,7NRZI recording bit is not satisfactorily restrained. This fluctuation is particularly marked in optical recording/reproduction apparatuses such as recording/reproduction apparatuses for magneto-optical disks, etc., as compared to magnetic recording/reproduction apparatuses Namely, with an optical recording/reproduction apparatus, the read signal B itself includes a DC component (for example, two types of signals '1" and "0" do not have, at least, different polarities), whereas with a magnetic recording/reproduction apparatus, the read analog signal does not contain any DC component (the two types of signals have mutually different polarities). In addition, the comparative voltage E indicated by a dotted line, lags behind the reproduction signal D.

FIGS. 24 and 25 illustrate in detail the process of converting the waveforms shown in FIG. 23 into digital data.

As shown in FIG. 24, when the 8/10NRZI method is adopted, the comparative voltage E (FIG. 24(b)) coincides with the center level of the reproduction signal D thereby enabling the digital data C (FIG. 24(c)) to accurately correspond to the recording bits (FIG. 24(a)).

Meanwhile, as shown in FIG. 25, when the 2,7NRZI method is adopted, the comparative voltage E (FIG. 25(b)) is vertically shifted. This is due to the fact, as was discussed earlier, that the envelope of the reproduction signal D vertically fluctuates as shown in FIG. 23(b), and that the comparative voltage E lags behind the reproduction signal D. As a result, the digital data C does not correspond to the recording bits (FIG. 25(a)), as shown by the dotted line in FIG. 25(c), which is the cause of reproduction errors.

It is thus difficult to achieve a high recording density with the conventional data reproduction circuit shown in FIG. 18 when a modulation method including a DC component (e.g. the 2,7 NRZI method) is adopted. In other terms, even if a method enabling achievement of a high recording density, such as the 2,7NRZI method, is adopted, the conversion into digital data is infeasible with a conventional data reproduction circuit.

(2) Difficulty to Achieve Compatibility

As it can be seen by comparing FIGS. 18 and 21, the data reproduction circuits respectively designed for the NRZI and RZ methods are entirely different afterward the equalizers and LPFs 1802 and 2102. Therefore, in order to be compatible with both methods, the data reproduction circuit has to be equipped separately with both circuit sections following the equalizers and LPFs 1802 and 2102. It is thus particularly difficult to achieve compatibility with both NRZI and RZ methods when aiming at designing a compact apparatus.

(3) Difficulty to Achieve High Speed

As illustrated in FIG. 26(a), each track of an optical disk is, for example, divided into a plurality of sectors. When recording, reproducing or erasing sector by sector, the level of the read analog signal B is higher (generally 3 to 10 times) when a sector is recorded or erased than when a sector is reproduced. This due to the fact that the intensity of the laser beam 1602 is higher when recording or erasing data. In addition, one of the features of an optical recording/reproduction apparatus is that, as mentioned above, the read analog signal B includes a DC component (in FIG. 26(a), the level increases exclusively on one side, e.g. the positive side). This represents a difference with other data reproduction circuits (e.g., of magnetic recording/reproduction apparatuses).

Accordingly, a great transient response occurs in the output signals released from the capacitors 1805 and 2105 shown in FIGS. 18 and 21, and in the section indicated by BB in FIG. 26(b), the above output signals go beyond the reproduction level range immediately after recording or erasing. Here, the upper and lower limits of the reproduction level range are indicated by dotted lines As described above, because the read analog signal B includes a DC component, the transient response is pronounced as compared to other data reproduction circuits The reproduction of data immediately after recording or erasing was executed is thus infeasible. Reproduction is thus infeasible until the transient response is over whereby high speed can not be achieved. Moreover, if the distance separating sectors is increased so that reproduction does not have to be executed immediately after recording or erasing, a high recording density is difficult to achieve.

SUMMARY OF THE INVENTION

An object of the present invention is to provide a data reproduction circuit designed for recording/reproduction methods and modulation methods enabling to achieve a high recording density.

Another object of the present invention is to provide a data reproduction circuit compatible with various recording/reproduction methods and various modulation methods.

Still another object of the present invention is to provide a data reproduction circuit than can to achieve a high speed.

In order to achieve the above objects, a data reproduction circuit that converts a read analog signal read from a data recording medium into digital data coinciding with original recording digital data. The circuit has a second order differential means for emitting a second order differentiated signal derived from the read analog signal. There is a comparative voltage generating means for emitting a comparative voltage that can be switched changed to different levels, and comparing means for comparing the second order differentiated signal and the comparative voltage to generate the digital data.

In the above configuration, provision is made such that the digital data is generated from the second order differentiated signal derived from the read analog signal. Such an arrangement permits cancelling of a DC component contained in the read analog signal. In particular, the above configuration enables to provide an error free data reproduction circuit designed for a method where the DC component is not restrained (e.g., a 2,7NRZI method). Recording/reproduction may thus be executed through the 2,7NRZI method that enables to achieve a higher recording density than a 8/10NRZI method whereby a data recording/reproduction apparatus permitting a high recording density may be designed. Reproduction may of course be executed through a method restraining the DC component (e.g., the 8/10NRZI method) as well.

Whereas in the conventional art reproduction could only be executed through a method where the DC component is restrained, the above data reproduction circuit enables reproduction to be also feasible through a method where the DC component is not restrained. Compatibility between magneto-optical recording/reproduction apparatuses and magneto-optical disks adopting various methods, may thus be achieved.

The data reproduction circuit in accordance with the present invention further comprises a peak detecting circuit that is equipped with first order differential means for generating a first order differentiated signal derived from the read analog signal, second comparative voltage generating means for emitting a second comparative voltage that can be switched between different levels, and second comparing means for comparing the first order differentiated signal and the second comparative voltage to generate digital data. The peak detecting circuit detects and converts the peak of the read analog signal into the digital data.

With the above configuration, peaks may be detected through the first order differentiated signal derived from the read analog signal when an RZ method is adopted, and edges may be detected through the second order differentiated signal when an NRZI method is adopted. The circuit may thus be employed for both the RZ and the NRZI methods whereby a compact data reproduction circuit presenting a high compatibility may be designed.

Further, a data reproduction circuit in accordance with the present invention is characterized in that at least one of the differential means for generating the first order differentiated signal or second order differentiated signal from the read analog signal, is disposed ahead of a circuit component that determines a reproduction level range.

Accordingly, with the above configuration, the read analog signal is fed into the circuit component where the reproduction level range is determined after being differentiated at least once. This permits reduction in a transient response occurring during recording/erasing and reproduction. Reproduction is thus always executed within the reproduction level range. An error free data reproduction circuit permitting to achieve a high speed and a high recording density may thus be designed.

As described above, the present invention offers a data reproduction circuit enabling to achieve high speed and high recording density while being compatible with all RZ and NRZI methods. The present invention provides a data reproduction circuit that is particularly effective for optical recording/reproduction apparatuses whose read analog signal contains a DC component.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram schematically illustrating the configuration of a data reproduction circuit.

FIG. 2 is a circuit diagram illustrating in detail the data reproduction circuit.

FIG. 3 is an explanatory view illustrating the principle of recording/reproduction adopting an NRZI method.

FIG. 4 is an explanatory view illustrating the principle of recording/reproduction adopting an RZ method.

FIG. 5(a) is an explanatory view schematically illustrating a waveform of a read analog signal.

FIG. 5(b) is an explanatory view schematically illustrating a waveform of a first order differentiated signal.

FIG. 8 is a circuit diagram illustrating a data reproduction circuit.

FIG. 9 is a circuit diagram illustrating an example of a clamping circuit.

FIG. 10 is an explanatory view illustrating the principle of recording/reproduction adopting the NRZI method.

FIG. 11 is a circuit diagram illustrating a section of a data reproduction circuit.

FIG. 12 is a circuit diagram illustrating a combined use of the circuit shown in FIG. 11 and the circuit shown in FIG. 7.

FIG. 13 is an explanatory view illustrating the principle of recording/reproduction adopting the NRZI method.

FIG. 14 is a circuit diagram illustrating a section of a data reproduction circuit FIG. 15 is an explanatory view illustrating the principle of recording/reproduction adopting the NRZI method.

FIGS. 16 to 26 illustrate conventional examples.

FIG. 16 is a schematic organization chart illustrating a magneto-optical recording/reproduction apparatus.

FIG. 17 is an explanatory view illustrating the principle of recording/reproduction adopting the NRZI method.

FIG. 18 is a circuit diagram illustrating a data reproduction circuit designed for the NRZI method.

FIG. 19 is an explanatory view illustrating the principle of recording/reproduction adopted in the circuit shown in FIG. 18.

FIG. 20 is an explanatory view illustrating the principle of recording/reproduction adopting the RZ method.

FIG. 21 is a circuit diagram illustrating a data reproduction circuit designed for the RZ method.

FIG. 22 is an explanatory view illustrating the principle of recording/reproduction adopted in the circuit shown in FIG. 21.

FIG. 23(a) is an explanatory view illustrating a waveform of a reproduction signal obtained when an 8/10NRZI method is adopted.

FIG. 23(b) is an explanatory view illustrating the waveform of a reproduction signal obtained when a 2,7NRZI method is adopted.

FIGS. 24(a), 24(b) and 24(c) are an explanatory view illustrating the principle of recording/reproduction adopting the 8/10NRZI method.

FIGS. 25(a), 25(b) and 25(c) are an explanatory view illustrating the principle of recording/reproduction adopting the 2,7NRZI method.

FIG. 26(a) is an explanatory view schematically illustrating a waveform of a read analog signal.

FIG. 26(b) is an explanatory view schematically illustrating waveforms of output signals released from capacitors.

DETAILED DESCRIPTION OF THE PREFERRED EMBODIMENTS

A preferred embodiment of the present invention will be described hereinbelow with reference to FIGS. 1 to 5.

Figure 1:
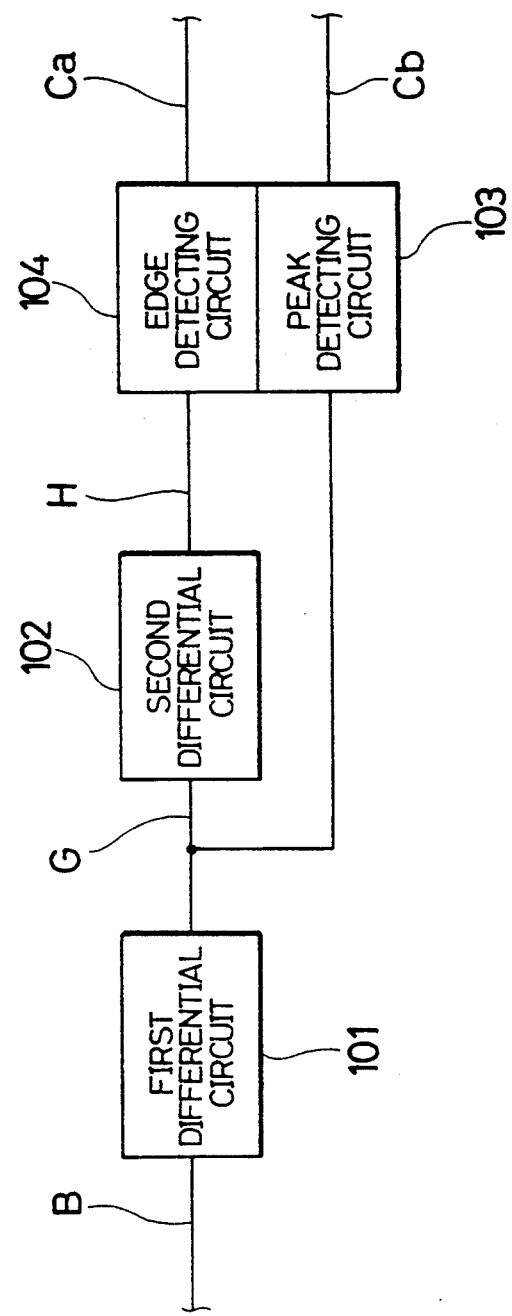
FIGS. 1 through 5 illustrate an embodiment of the present invention.

FIG. 1 is a block diagram illustrating essential parts of a data reproduction circuit of the present embodiment. A read analog signal B is read through an optical head (not shown) from a recording medium (not shown) such as a magneto-optical disk or other medium. The read analog signal B is sent to a first differential circuit 101 serving as first order differential means, that releases a first order differentiated signal G to be sent to a second differential circuit 102 serving as second order differential means, and to a peak detecting circuit 103. A second order differentiated signal H released from the second differential circuit 102 is sent to an edge detecting circuit 104. The edge detecting circuit 104 compares the second order differentiated signal H with a second comparative voltage, to be described later, to release first digital data Ca (NRZI method). The peak detecting circuit 103 compares the first order differentiated signal G with a first comparative voltage (to be described later) to release second digital data Cb (RZ method).

Figure 2:
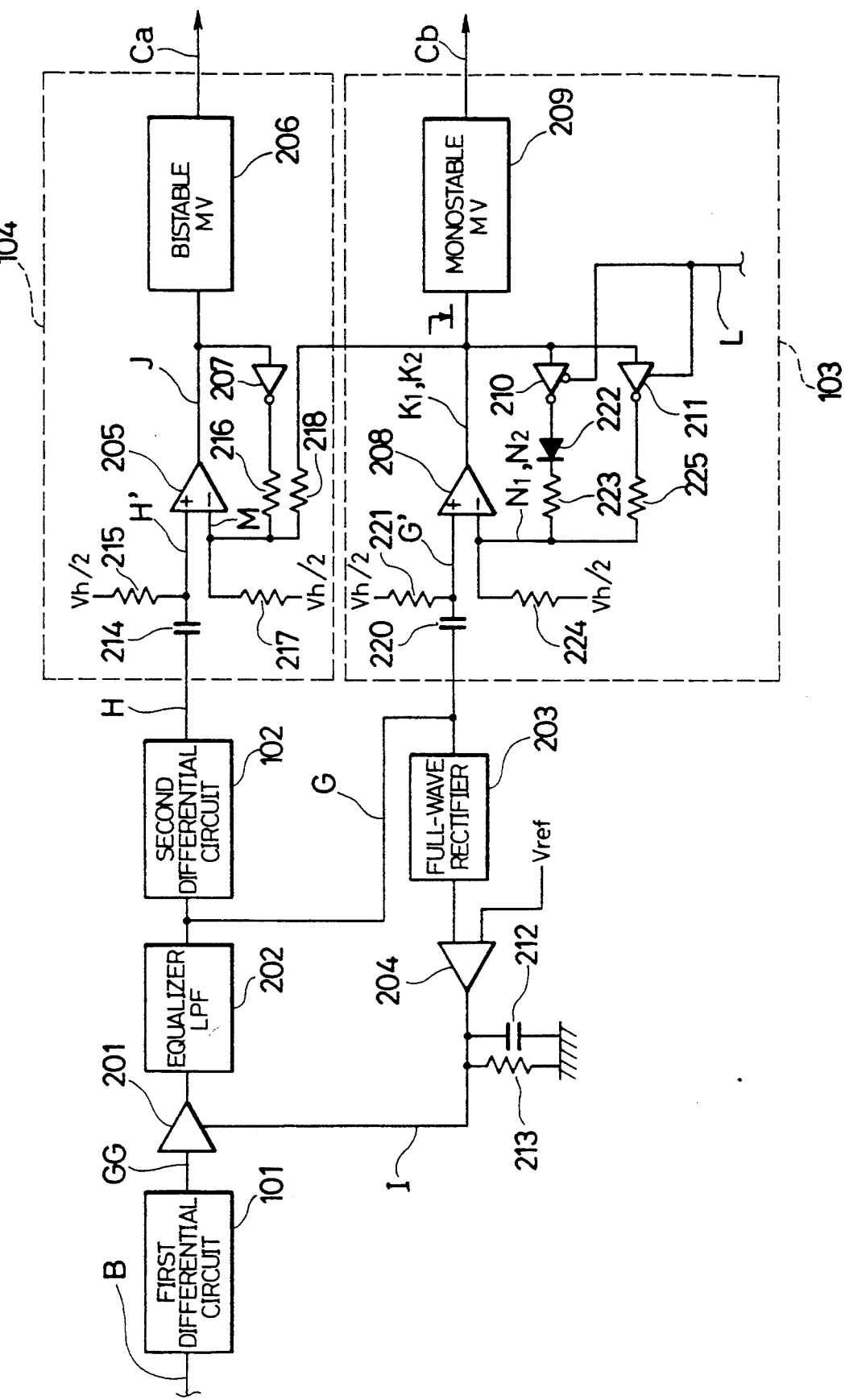

FIG. 2 illustrates in detail the data reproduction circuit shown in FIG. 1. Referring to FIG. 2, the read analog signal B is sent to a VCA (Voltage Controlled Amplifier) 201 via the first differential circuit 101. As it can be seen from the figure, the first differential circuit 101 is disposed ahead of the VCA 201, i.e. the circuit component determining the range of the reproduction level. Such an arrangement permits the transient response occurring when shifting from recording or erasing to reproduction to be reduced.

The read analog signal B goes through an AGC (Automatic Gain Control) process in the VCA 201 where the amplification degree is controlled by an amplification degree control signal I. It is then sent to the second differential circuit 102, the peak detecting circuit 103 and a full-wave rectifier 203 via an equalizer and LPF 202. The output signal released from the second differential circuit 102 is fed into the edge detecting circuit 104, as mentioned earlier.

The output signal released from the full-wave rectifier 203 is fed into a comparator 204 where it is compared with a comparative voltage Vref to release an output signal sent to a capacitor 212, a resistance 213 and the VCA 201. When the amplitude of the first order differentiated signal G released through the equalizer and LPF 202 exceeds the comparative voltage Vref, the capacitor 212 is charged. On the other hand, when the amplitude of the first order differentiated signal G does not exceed the comparative voltage Vref, the capacitor 212 is discharged. The above AGC is executed according to this charge and discharge.

The second order differentiated signal H released from the second differential circuit 102 is sent to the edge detecting circuit 104. More specifically, the second order differentiated signal H is fed into a resistance 215 and a non-inverted input terminal of a comparator 205 (first comparing means) via a capacitor 214. Another terminal of the resistance 215 is connected to a power source Vh/2. A first digital output signal J, i.e. the output signal released from the comparator 205, is fed into a bistable multivibrator (hereinafter referred to as bistable MV) 206 and an inverter 207. The output signal released from the inverter 207 is sent via a resistance 216 to the inverted input terminal of the comparator 205 and to one of the terminals of each of resistances 217 and 218. Another terminal of the resistance 217 is connected to a power source Vh/2 while another terminal of the resistance 218 is connected to the output of a comparator 208 to be described layer. The inverter 207 and the comparator 208 belong to first comparative voltage generating means.

The bistable MV 206 emits a pulse as the first digital output signal J released from the comparator 205, rises and drops (two way). This pulse constitutes the first digital data Ca.

The first order differentiated signal G released from the equalizer and LPF 202 is sent to the peak detecting circuit 103. More specifically, the first order differentiated signal G is sent via a capacitor 220 to a resistance 221 and a non-inverted input terminal of the comparator 208 (second comparing means). Another terminal of the resistance 221 is connected to a power source Vh/2. The output of the comparator 208 is connected to a monostable multivibrator (hereinafter referred to as monostable MV) 209, three-state inverters 210 and 211 and the resistance 218. The output signal released from the three-state inverter 210 is sent via a diode 222 and a resistance 223 to an inverted input terminal of the comparator 208 and to one of the terminals of each of resistances 224 and 225. Another terminal of the resistance 224 is connected to a power source Vh/2 while another terminal of the resistance 225 is connected to the output of the three-state inverter 211. The three-state inverters 210 and 211 belong to second comparative voltage generating means.

The monostable MV 209 emits a pulse as a second digital output signal $K_2$·($K_1$ denotes the NRZI method while $K_2$ denotes the RZ method) released from the comparator 208, drops. This pulse constitutes the second digital data Cb. The three-state inverter 210 is open (high-impedance output) when a control signal L is in a high level. As to the three-state inverter 211, it is open (high-impedance output) when the control signal L is in a low level.

The edge detecting circuit 104 and the peak detecting circuit 103 of the present embodiment differ from a conventional differential zero-cross detecting circuit in that the comparative voltages thereof possess a plurality of levels that can be switched The first digital data Ca is the data to be employed when the NRZI method is adopted while the second digital data Cb is the data to be employed when the RZ method is adopted. The voltage supplied from the power source Vh/2 is equal to half the high level output voltage Vh of the comparators 205 and 208, the inverter 207, and the three-state inverters 210 and 211.

Figure 3:
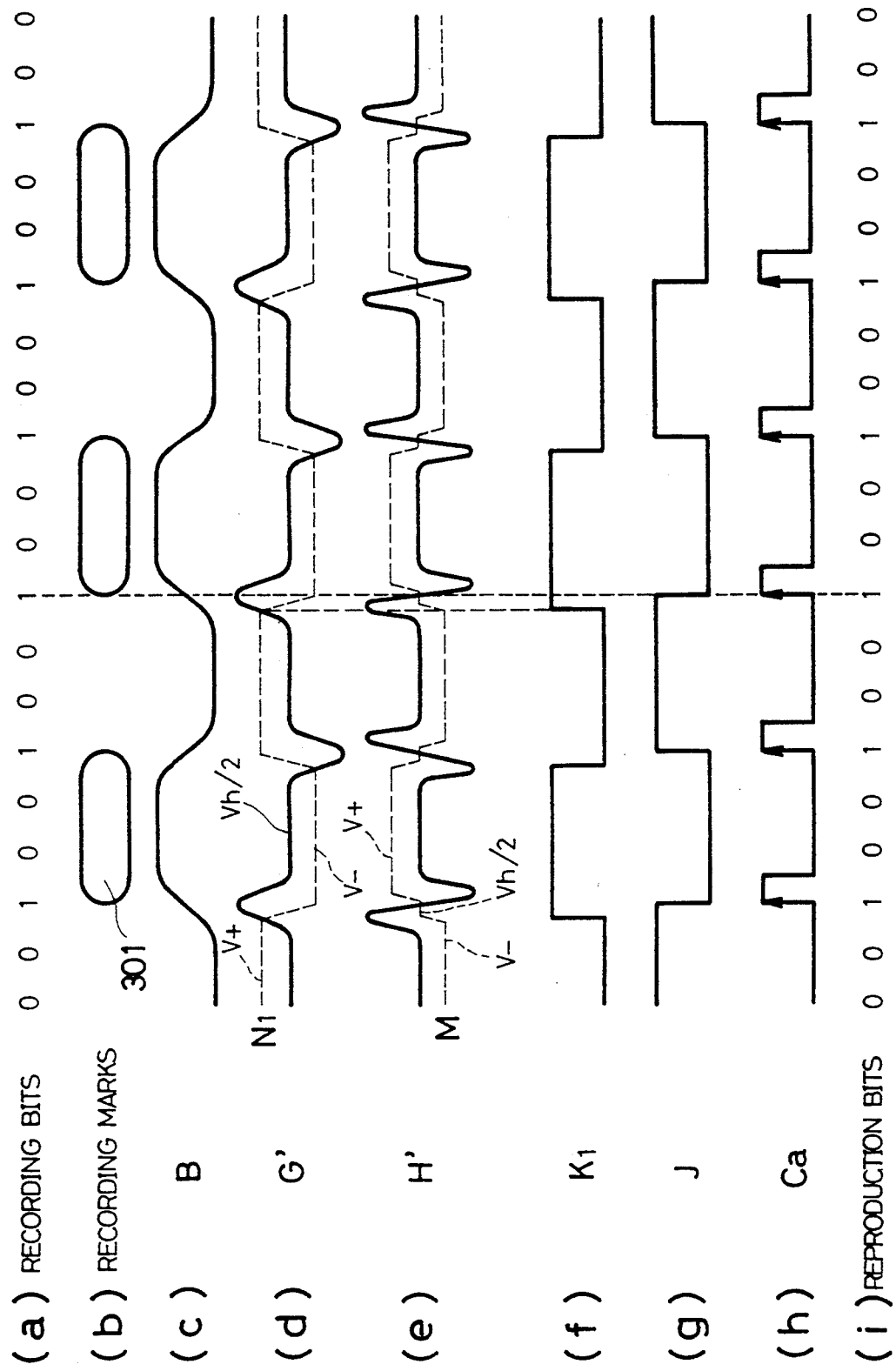
Figure 4:
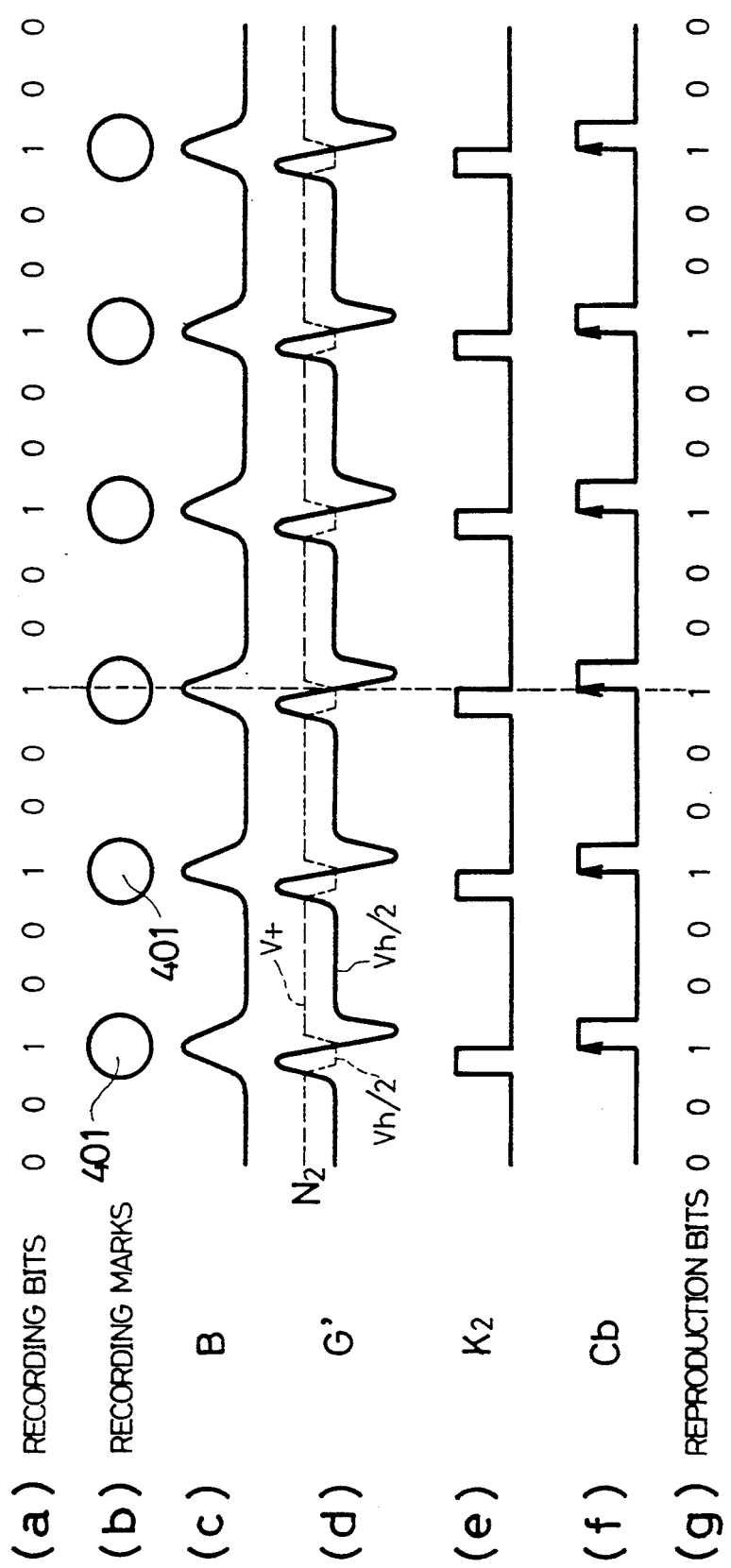
Figure 5:
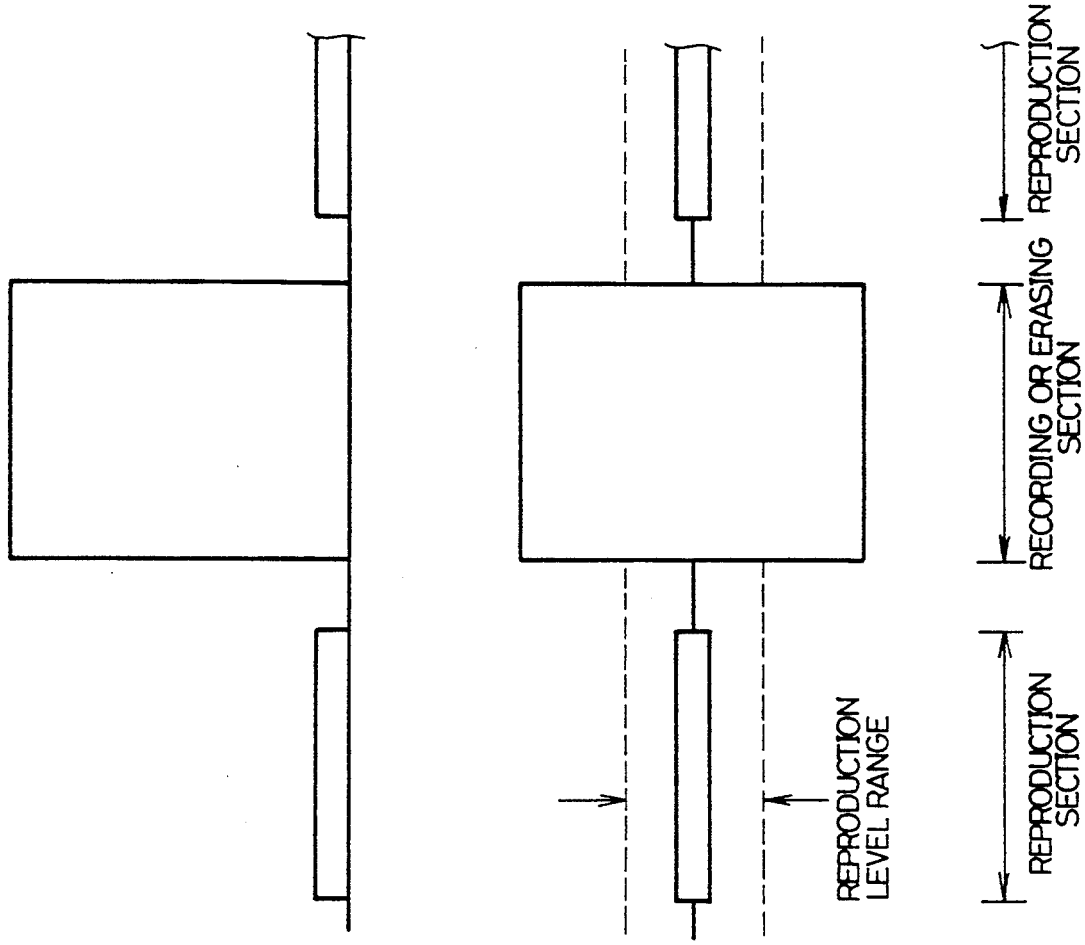

FIGS. 3 and 4 illustrate waveforms of signals obtained in different sections of the data reproduction circuit shown in FIG. 2. Here, FIG. 3 illustrates the reproduction process when the NRZI method is adopted (the control signal L is in the high level), while FIG. 4 illustrates the reproduction process when the RZ method is adopted (the control signal L is in the low level).

First, the NRZI method will be discussed. As shown in FIG. 3, recording is executed such that the leading and trailing edges of a recording mark 301 (FIG. 3(b)) coincide with a recording bit "1". During reproduction, the read analog signal B (FIG. 3(c)) may be obtained by reading the recording marks 301. According to the configuration shown in FIG. 2, a first order differentiated signal G, (shown by a solid line in FIG. 3(d)) that passed through the capacitor 220 is compared with a comparative voltage $N_1$ (shown by a dotted line in FIG. 3(d)) possessing a plurality of voltage levels, to produce a second digital output signal $K_1$ (FIG. 3(f)) having a hysteresis characteristic.

With the NRZI method, while the second digital output signal $K_1$ is in a low level, a high level voltage Vh is supplied to the inverted input terminal of the comparator 208 via the three-state inverter 211 and the resistance 225 (a voltage Vh/2 is also supplied to the inverted input terminal via the resistance 224). The comparative voltage $N_1$ is thus equal to $V_+$. While the second digital output signal $K_1$ is in a high level, a low level voltage is supplied to the inverted input terminal of the comparator 208 whereby the comparative voltage $N_1$ is equal to $V_-$. The second digital output signal $K_1$ is inverted at the intersection point of the first order differentiated signal G' and the comparative voltage $N_1$.

The comparative voltage M (shown by a dotted line in FIG. 3(e)) to which the second order differentiated signal H' (shown by a solid line in FIG. 3(e)) is compared after passing through the capacitor 214 (FIG. 2), is switched between a plurality of voltage levels in response to the second digital output signal $K_1$ and the first digital output signal J released from the comparator 205. Namely, while the first digital output signal J is in the high level and the second digital output signal $K_1$ is in the low level, the comparative voltage M is equal to $V_-$. While the first digital output signal J is in the low level and the second digital output signal $K_1$ is in the high level, the comparative voltage M is equal to $V_+$. While the first digital output signal J and the second digital output signal $K_1$ are both in the high level or both in the low level, the comparative voltage M is equal to Vh/2. The first digital output signal J is inverted at the intersection point of the second order differentiated signal H' and the comparative voltage M that is equal to Vh/2.

In other terms, the first digital output signal J (FIG. 3(g)) is inverted exactly at the point where the second order differentiated signal H' is inverted. The inversion of the first digital output signal J coincides with the leading edge and trailing edge of the recording marks 301. As a result, the reproduction bits (FIG. 3(i) derived from the digital data Ca (FIG. 3(h)) released from the bistable MV 206, faithfully coincides with the recording bits (FIG. 3(a)).

Figure 21:
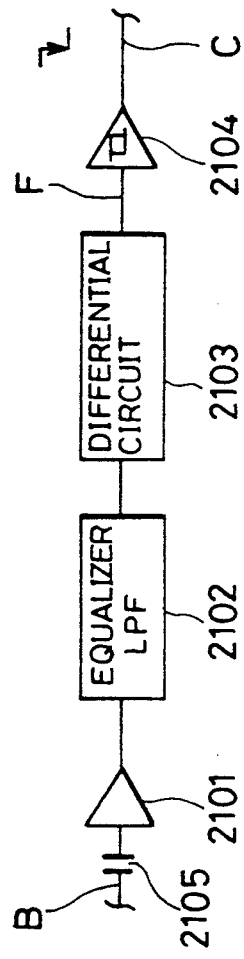
Figure 22:
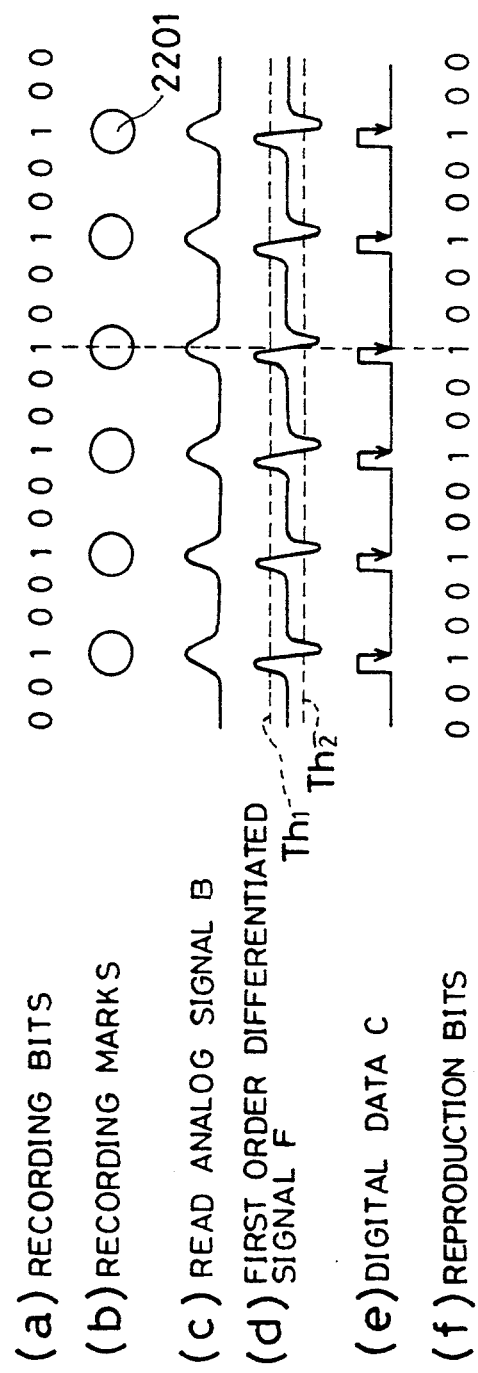

To sum up the above description, the present data reproduction circuit presents the following characteristics:

(1) it is free from zero-cross noises occurring in a conventional differential zero-cross detecting circuit;

(2) the zero-cross points are accurately detected (the conventional hysteresis comparator 2104 shown in FIG. 21 causes delay whereby the zero-cross points can not be accurately detected); and (3) data signal is detected through the first order differentiated signal G' and the second order differentiated signal H', and is not affected by the DC component included in the read analog signal B.

Now the recording/reproduction process adopted with the RZ method will be discussed hereinbelow with reference to FIG. 4. With the RZ method, recording is executed such that each recording bit "1" coincides with the center of a recording mark 401 (FIG. 4(b)) and the read analog signal B (FIG. 4(c)) is produced by reading the recording marks 401.

According to the configuration shown in FIG. 2, the first order differentiated signal G' (shown by a solid line in FIG. 4(d)) that passed through the capacitor 220 is compared with a comparative voltage $N_2$ (shown by a dotted line in FIG. 4(d); $N_1$ denotes the comparative voltage adopted with the NRZI method and $N_2$ denotes the comparative voltage adopted with the RZ method) to produce the second digital output signal $K_2$ (FIG. 4(e)) having a hysteresis characteristic.

During reproduction with the RZ method, while the second digital output signal $K_2$ is in a low level, a high level output voltage Vh is supplied to the inverted input terminal of the comparator 208 via the three-state inverter 210, the diode 222 and the resistance 223 (voltage is also supplied to the inverted input terminal from the power source Vh/2). The comparative voltage $N_2$ is thus equal to $V_+$. While the second digital output signal $K_2$ is in a high level, a low level output voltage is cut off by the diode 222 after being inverted in the three-state inverter 210 whereby the comparative voltage $N_2$ is equal to Vh/2. The second digital output signal $K_2$ is inverted at the intersection point of the first order differentiated signal G' and the comparative voltage $N_2$.

Accordingly, the second digital output signal $K_2$ falls exactly at the point where the first order differentiated signal G' falls. Moreover, the fall of the second digital output signal $K_2$ coincides with the center of the recording mark 401. As a result, the reproduction bits (FIG. 4(g)) derived from the second digital data Cb (FIG. 4(f)) released from the monostable MV 209, faithfully coincides with the recording bits (FIG. 4(a)).

The first differential circuit 101 (FIG. 2), the comparator 208 and other members are adopted for producing the first digital data Ca of the NRZI method as well as the second digital data Cb of the RZ method. Such an arrangement enables to simplify the configuration of the data reproduction circuit.

The function of the equalizer and LPF 202 is to 1) prevent the first digital data Ca and the second digital data Cb respectively shown in FIGS. 3 and 4 from being shifted or from fluctuating due to waveform interference, etc.; 2) ensure that the first order differentiated signal G' goes beyond the comparative voltage $N_1$ or $N_2$. In order to ensure that the first order differentiated signal G, goes beyond the comparative voltage $N_1$ or $N_2$, the Automatic Gain Control is executed in the VCA 201 with respect to a first order differentiated signal GG.

As shown in FIG. 5(a), the level of the read analog signal B is higher during recording/erasing than during reproduction. However, since the read analog signal B is differentiated in the first differential circuit 101, there is no transient response observed in the first order differentiated signal GG (FIG. 5(b)). As a result, the first order differentiated signal GG does not exceed the input range of the VCA 201 even immediately after recording/erasing whereby data may be reproduced within the reproduction level range This enables a high speed and a high recording density to be achieved Here, since the reproduction level range is determined according to the input range of the VCA 201, the first differential circuit 101 is installed ahead of the VCA 201. In the case that the reproduction level range is determined through an equalizer, a LPF, the second differential circuit 102 or other members, the first differential circuit 101 should be disposed ahead of these members.

Figure 6:
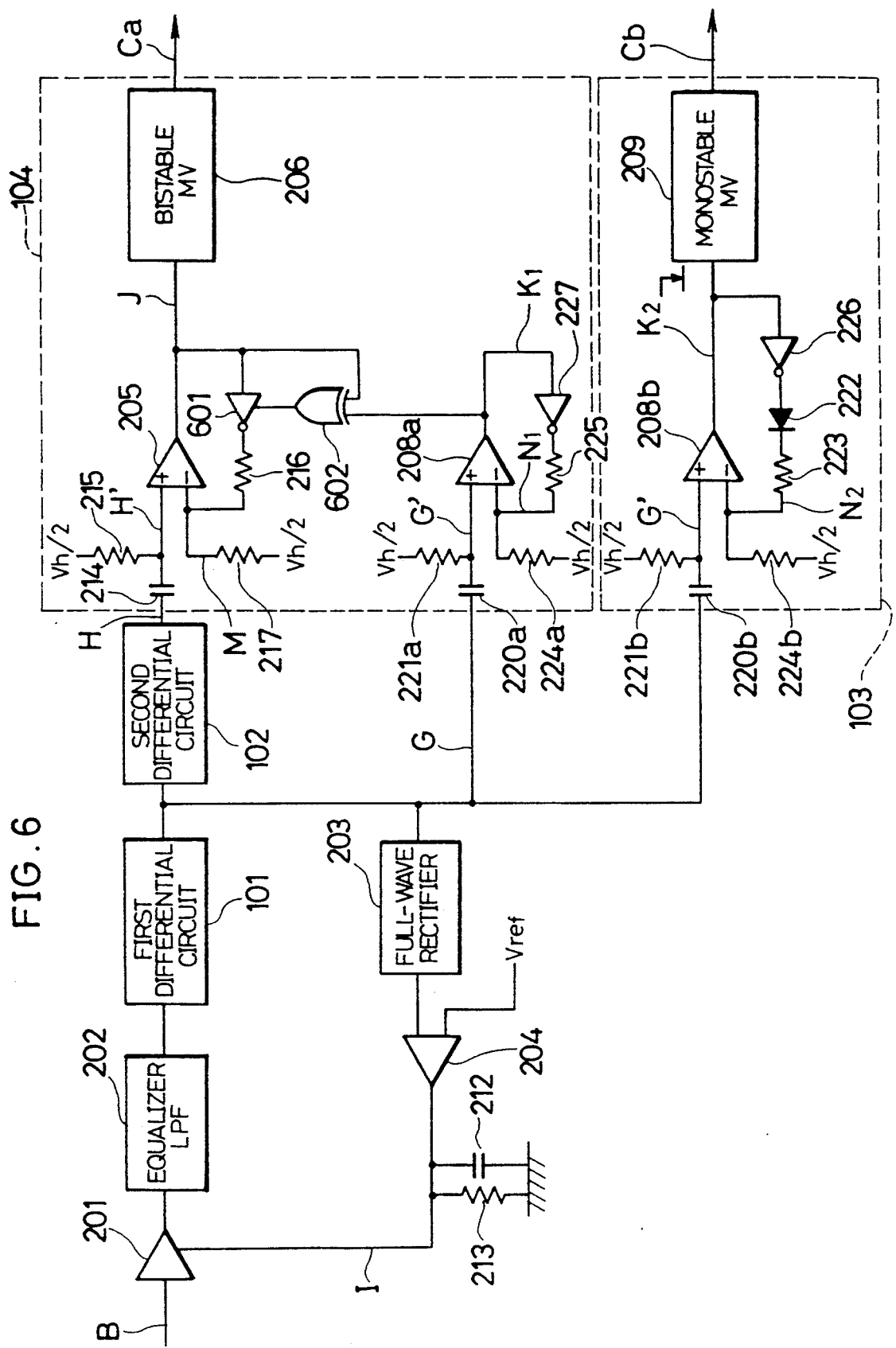
FIG. 6 is a circuit diagram illustrating a data reproduction circuit of a second embodiment of the present invention.

A second embodiment of the present invention will be discussed hereinbelow with reference to FIG. 6. Members that were also employed in the first embodiment will be designated by the same code and their description will be omitted.

A first order differentiated signal G released from a first differential circuit 101 is sent to a second differential circuit 102, a full-wave rectifier 203 and capacitors 220a and 220b.

Meanwhile, a second order differentiated signal H released from a second differential circuit 102 is sent via a capacitor 214 to a resistance 215 and a non-inverted input terminal of a comparator 205. Another terminal of the resistance 215 is connected to a power source Vh/2. The output signal released from the comparator 205 is fed into a bistable MV 206, a three-state inverter 601 and one of input terminals of an exclusive OR circuit (EX-OR circuit) 602.

The output signal released from the three-state inverter 601 is sent via a resistance 216 to an inverted input terminal of the comparator 205 and to a terminal of a resistance 217. Another terminal of the resistance 217 is connected to a power source Vh/2.

The bistable MV 206 emits a pulse as a first digital output signal J released from the comparator 205, rises and drops (two way). This pulse constitutes the first digital data Ca of the NRZI method.

The first order differentiated signal G is sent via the capacitor 220a to a resistance 221a and a non-inverted input terminal of a comparator 208a. Another terminal of the resistance 221a is connected to a power source Vh/2. A second digital output signal $K_1$ released from the comparator 208a, is fed into another input terminal of the EX-OR circuit 602 and into an inverter 227.

The signal released from the inverter 227 is sent through a resistance 225 to the inverted input terminal of the comparator 208a and to a terminal of a resistance 224a. Another terminal of the resistance 224a is connected to a power source Vh/2. This permits, like in the first embodiment, comparative voltages M and $N_1$ to be respectively switched to a plurality of levels in an edge detecting circuit 104 and a peak detecting circuit 103.

In addition, the first order differentiated signal G is sent via the capacitor 220b to a resistance 221b and to a non-inverted terminal of a comparator 208b. Another terminal of the resistance 221b is connected to a power source Vh/2. A second digital output signal $K_2$ released from the comparator 208b is fed into a monostable MV 209 and an inverter 226. The output signal released from the inverter 226 is sent via a diode 222 and a resistance 223 to an inverted input terminal of the comparator 208b and to a terminal of a resistance 224b. Another terminal of the resistance 224b is connected to a power source Vh/2. The output signal released from the monostable MV 209 constitutes second digital data Cb of the RZ method. Here, the waveforms of signals produced in the different sections of the data reproduction circuit shown in FIG. 6, are as illustrated in FIGS. 3 and 4 of the first embodiment.

Namely, the output signal released from the EX-OR circuit 602 is in a high level when either the first digital output signal J (FIG. 3(g)) or the second digital output signal $K_1$ (FIG. 3(f)) only is in a high level. Consequently, the three-state inverter 601 releases an inverted signal of the first digital output signal J when either the first digital output signal J or the second digital output signal $K_1$ only is in the high level At this time, like in the first embodiment, the comparative voltage M (shown by a dotted line in FIG. 3(e)) is equal to either $V_+$ or $V_-$ according to the first digital output signal J. Also, when the three-state inverter 601 is shut, the comparative voltage M is equal to Vh/2.

As to the peak detecting circuit 103, it is equipped with two separate comparators respectively designed for the NRZI and RZ methods, i.e., the comparators 208a and 208b. The operation of the peak detecting circuit 103 is thus essentially analogous to that discussed in the first embodiment.

The difference between the first and second embodiments lies in the fact that in the second embodiment, the first digital data Ca and the second digital data Cb may be obtained concurrently thereby enabling data to be concurrently recorded on and/or reproduced from a magneto-optical disk through both NRZI and RZ methods. In addition, like in the first embodiment, the first differential circuit 101 of the second embodiment may be installed ahead of the VCA 201.

A third embodiment of the present invention will be discussed with reference to FIG. 7.

Figure 7:
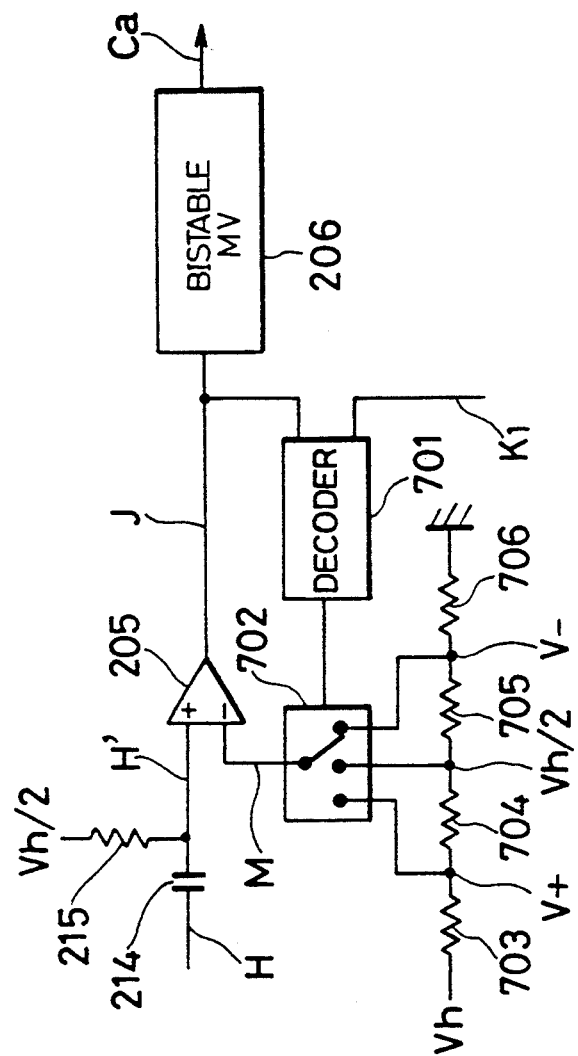
FIG. 7 is a circuit diagram illustrating a section of a data reproduction circuit of a third embodiment of the present invention.

FIG. 7 exclusively shows the section where first digital data Ca is produced. Description of members discussed in the first and second embodiments will be omitted.

As shown in FIG. 7, a second order differentiated signal H is sent via a capacitor 214 to a resistance 215 and a non-inverted input terminal of a comparator 205. Another terminal of the resistance 215 is connected to a power source Vh/2. The output of the comparator 205 is connected to a bistable MV 206 and a decoder 701. Provision is made such that an analog switch 702 is switched by the decoder 701 as shown in the following Table 2, depending on how high and low levels of a first digital output signal J from the comparator 205 and of a second digital output signal K: from a comparator 208 (not shown in FIG. 7) are combined.

To the three input terminals of the analog switch 702 are respectively fed voltages $V_+$, Vh/2, $V_-$ obtained by dividing a power source voltage Vh to 0 [V] by means of four resistances 703 to 706. The output signal from the analog switch 702 is sent to an inverted input terminal of the comparator 205. This arrangement enables a comparative voltage M to be switched to a plurality of levels by means of the decoder 701 in the third embodiment.

TABLE 2

| J | $K_1$ | M |
|---|---|---|
| 0 | 0 | Vh/2 |
| 0 | 1 | V+ |
| 1 | 0 | V− |
| 1 | 1 | Vh/2 |

A fourth embodiment of the present invention will be discussed hereinbelow with reference to FIGS. 8 to 10.

Figure 8:
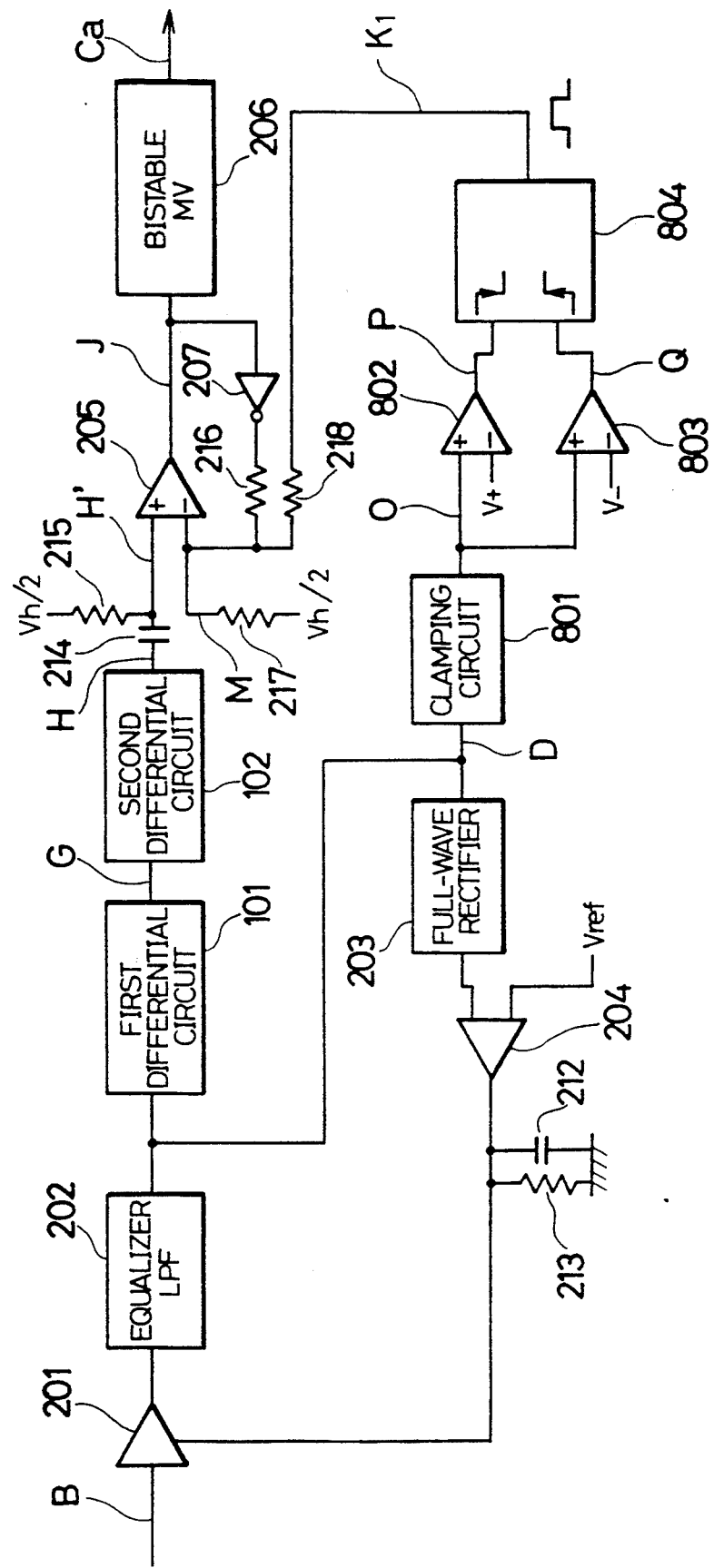
FIGS. 8 to 10 illustrate a fourth embodiment of the present invention.

As illustrated in FIG. 8, a read analog signal B is sent via a VCA 201 and an equalizer and LPF 202 to a first different circuit 101, a full-wave rectifier 203 and a clamping circuit 801. A first order differentiated signal G released from the first differential circuit 101 is further differentiated in a second differential circuit 102 to produce a second order differentiated signal H that is sent via a capacitor 214 to a resistance 215 and a non-inverted input terminal of a comparator 205. Another terminal of the resistance 215 is connected to a power source Vh/2.

The output signal released from the comparator 205 is fed into a bistable MV 206 and an inverter 207. The output signal from the inverter 207 is sent via a resistance 216 to an inverted input terminal of the comparator 205 and to one of the terminals of each of resistances 217 and 218. Another terminal of the resistance 217 is connected to a power source Vh/2. As to another terminal of the resistance 218, it is connected to the output of a logic circuit 804. The bistable MV 206 emits a pulse as a first digital output signal J released from the comparator 205, rises and drops (two way). This pulse constitutes first digital data Ca of the NRZI method.

A reproduction signal 0 released from a clamping circuit 801 is fed into each non-inverted input terminal of two comparators 802 and 803. A comparative voltage $V_+$ is fed into an inverted input terminal of the comparator 802 while a comparative voltage $V_-$ is fed to an inverted terminal of the comparator 803. Output signals P and Q released from the comparators 802 and 803 are respectively fed into the logic circuit 804.

A second digital output signal $K_1$ released from the logic circuit 804 is in a low level in response to a falling edge of the output signal P released from the comparator 802, and is in a high level in response to a rising edge of the output signal Q released from the comparator 803. Such an arrangement enables a comparative voltage of an edge detecting circuit 104 and a comparative voltage of a peak detecting circuit 103 to be respectively switched to a plurality of levels as in the first embodiment.

Figure 9:
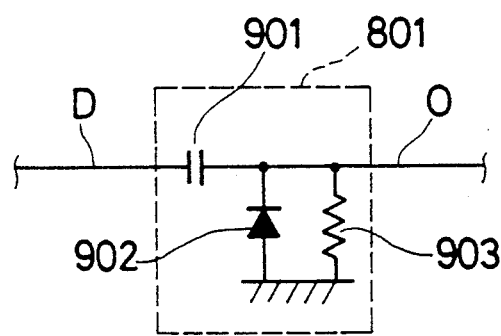

FIG. 9 shows an example of the clamping circuit 801. A reproduction signal D released from an equalizer and LPF 202 is sent via a capacitor 901 to a cathode of a diode 902 and a terminal of a resistance 903. An anode of the diode 902 and another terminal of the resistance 903 are connected to the ground.

Figure 10:
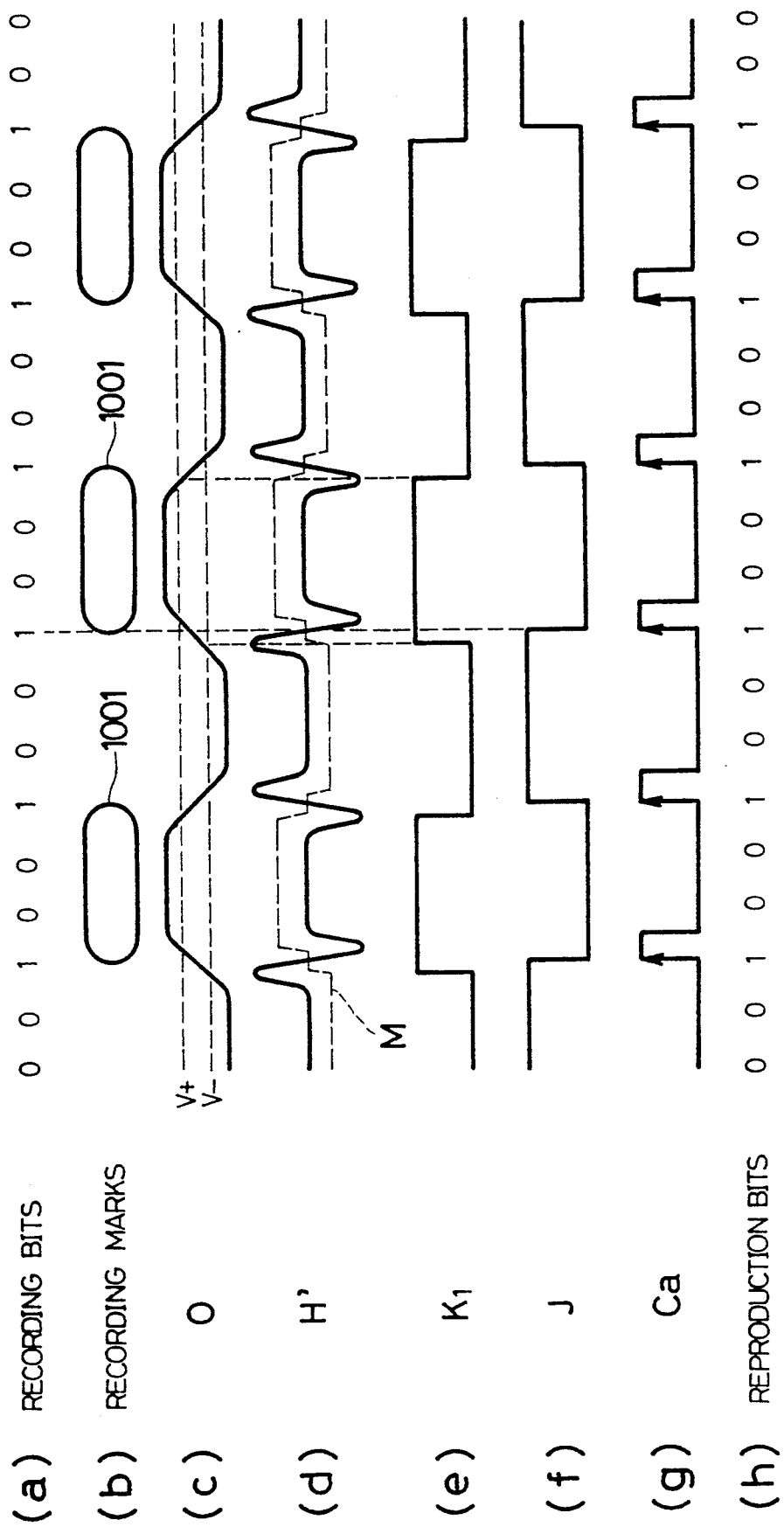

FIG. 10 illustrates waveforms produced in different sections of the data reproduction circuit shown in FIG. 8.

Recording marks 1001 as shown in FIG. 10(b) are recorded through the NRZI method in accordance with recording bits as shown in FIG. 10(a). When reading the recording marks 1001, the reproduction signal O as shown in FIG. 10(c) is released form the clamping circuit 801. Meanwhile, a comparative voltage $V_+$ is applied to the comparator 802 and a comparative voltage $V_-$ is applied to the comparator 803 to produce the second digital output signal $K_1$ (FIG. 10 (e)) in the same manner as in the first embodiment. The first digital output signal J (FIG. 10(f)) is generated based on a second order differentiated signal H' (FIG. 10(d)) that passed through the capacitor 214, and a comparative voltage M. Here, the comparative voltage M is switched between $V_+$, Vh/2 and $V_-$ in response to the first digital output signal J and the second digital output signal $K_1$.

Then, like in the first embodiment, the first digital data Ca (FIG. 10(g)) is generated in accordance with the rise and fall of the first digital output signal J. Reproduction bits (FIG. 10(h)) are produced based on the first digital data Ca.

Whereas in the first to third embodiments, the first order differentiated signal G' was adopted as reference for switching the comparative voltage M, in the fourth embodiment the reference adopted is the reproduction signal O.

A fifth embodiment of the present invention will be discussed hereinbelow with reference to FIGS. 11 to 13.

The description of members employed in the first to fourth embodiments will be omitted.

Figure 11:
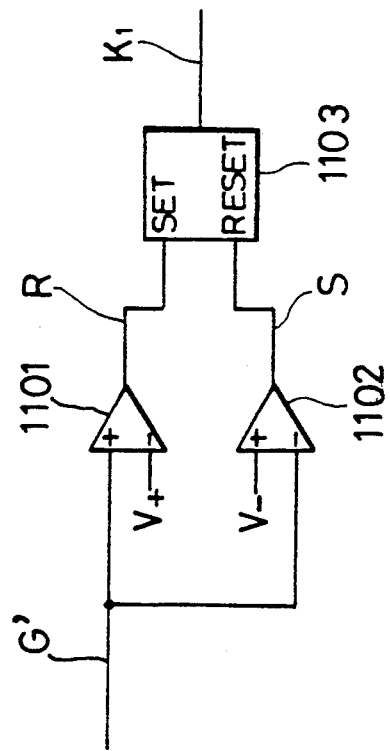

FIG. 11 illustrates only a section of a data reproduction circuit where a second digital output signal $K_1$ is derived from a first order differentiated signal G'. The first order differentiated signal G' is fed into a non-inverted input terminal of a comparator 1101 and into an inverted input terminal of a comparator 1102. A comparative voltage $V_+$ is applied to an inverted input terminal of the comparator 1101, and a comparative voltage $V_-$ is applied to a non-inverted input terminal of the comparator 1102. A digital output signal R from the comparator 1101 is fed into a SET terminal of a flip flop 1103. A digital output signal S from the comparator 1102 is fed into a RESET terminal of the flip flop 1103. The flip flop 1103 consequently releases a second digital output signal $K_1$ equivalent to that produced by the comparator 208 (FIG. 2) in the first embodiment.

Figure 13:
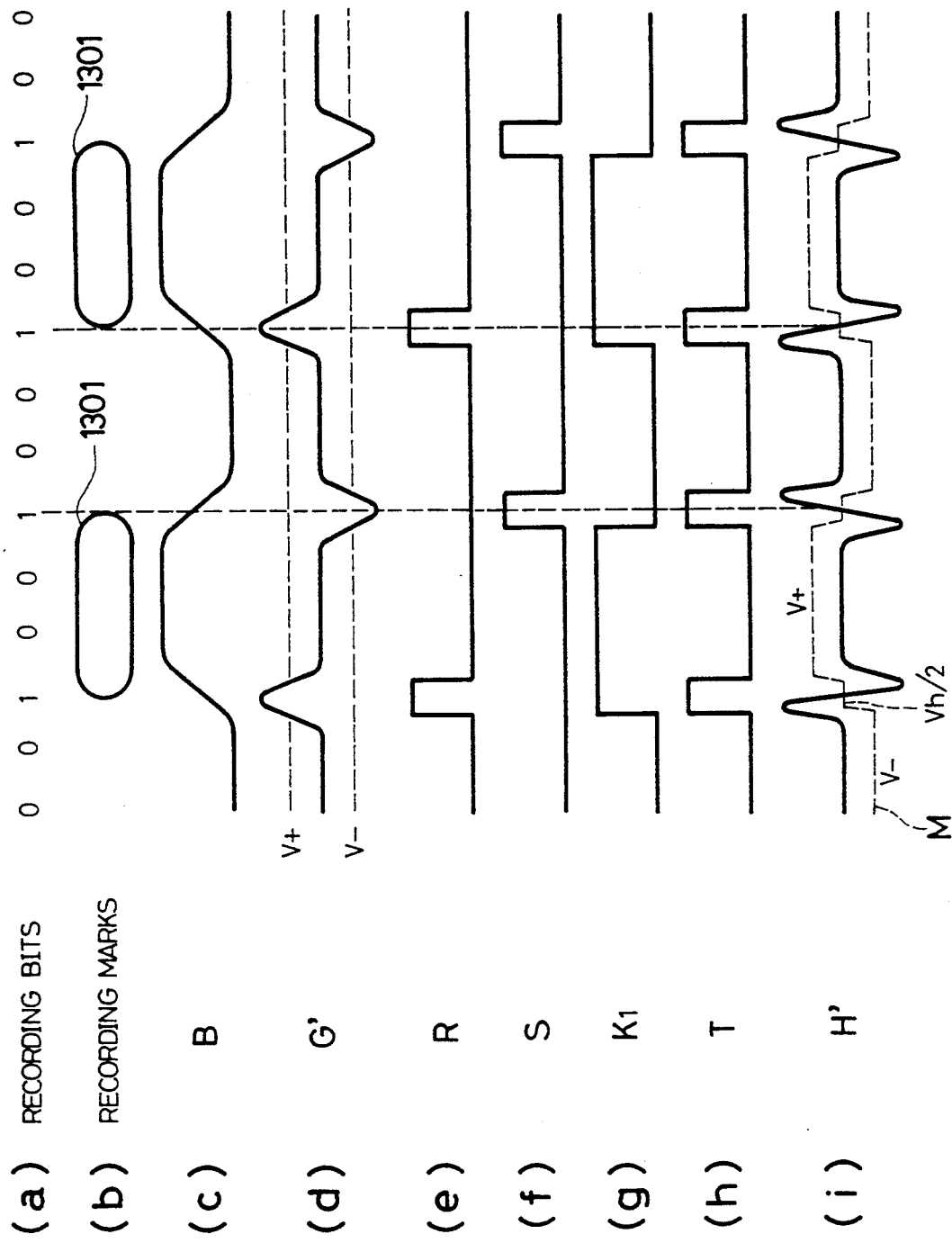

FIG. 13 illustrates waveforms produced in the different sections of the data reproduction circuit of the fifth embodiment. Recording marks 1301 as shown in FIG. 13(b) are recorded through the NRZI method in accordance with recording bits as shown in FIG. 13(a). The recording marks 1301 are read to produce a read analog signal B as shown in FIG. 13(c).

The read analog signal B is differentiated and passes through a capacitor to produce a first order differentiated signal G' (FIG. 13(d)). The first order differentiated signal G' is sliced in the comparator 1101 by the comparative voltage $V_+$ to produce an output signal R (FIG. 13(e)), and is sliced in the comparator 1102 by the comparative voltage $V_-$ to produce an output voltage S (FIG. 13(f)). A second digital output signal $K_1$ (FIG. 13(g)) is generated by the flip flop 1103 based on the output signals R and S. The second digital output signal $K_1$ is analogous to that of the first embodiment.

Figure 12:
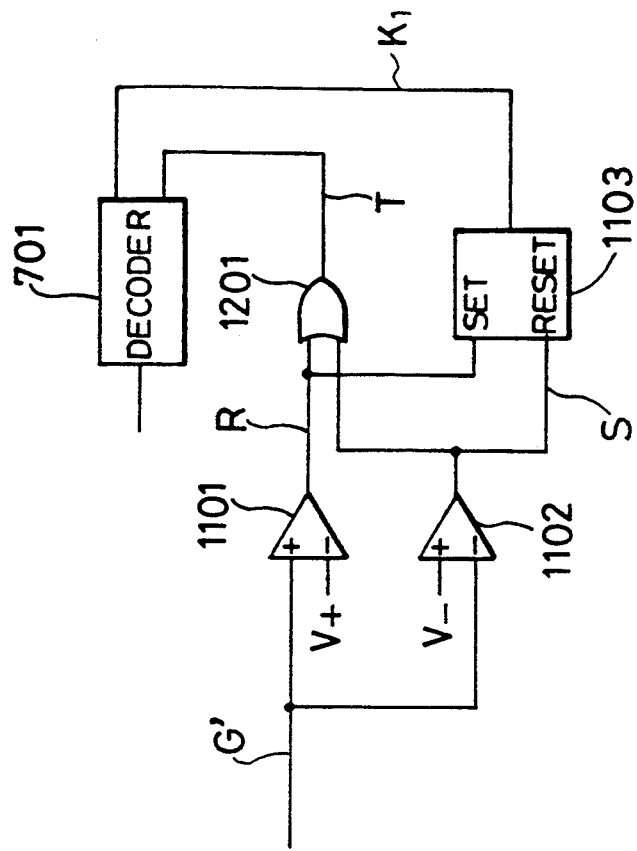
FIGS. 11 to 13 illustrate a fifth embodiment of the present invention.

FIG. 12 illustrates a circuitry designed by combining the present fifth embodiment and the third embodiment shown in FIG. 7.

Namely, the output signals R and S respectively released from the comparators 1101 and 1102 are fed into an OR gate 1201. The output signal T released from the OR gate 1201 (see FIG. 13(h)), and the second digital output signal $K_1$ from the flip flop 1103 are fed into the decoder 701 that switches the analog switch 702 shown in FIG. 7 as indicated in the following Table 3. As a result, the comparative voltage M fed into the inverted input terminal of the comparator 205 varies as shown by the dotted line in FIG. 13(i) and is analogous to that of the first embodiment.

TABLE 3

| T | $K_1$ | M |
|---|---|---|
| 0 | 0 | V− |
| 0 | 1 | V+ |
| 1 | 0 | Vh/2 |
| 1 | 1 | Vh/2 |

A sixth embodiment of the present invention will be discussed hereinbelow with reference to FIGS. 14 and 15. The description of members employed in the first to fifth embodiments will be omitted.

The sixth embodiment relates to a method of switching the analog switch 702 through the decoder 701 shown in FIG. 7. As illustrated in FIG. 14, a second order differentiated signal H, passes through a capacitor (not shown) to be fed into a non-inverted input terminal of a comparator 1401 and into an inverted input terminal of a comparator 1402. A comparative voltage $V_+$ is applied to an inverted input terminal of the comparator 1401 and a comparative voltage $V_-$ is applied to a non-inverted input terminal of the comparator 1402.

An output signal U released from the comparator 1401 is fed into one of input terminals of an OR gate 1404 and a SET terminal of a flip flop 1403. An output signal V released from the comparator 1402 is fed into another input terminal of the OR gate 1404 and a RESET terminal of the flip flop 1403.

An output signal X released from the OR gate 1404 is fed into a CK terminal (clock input terminal) of a D-type flip flop 1405. An inverted signal of the output signal X is fed into a CK terminal of a D-type flip flop 1406. An output signal W from the flip flop 1403 is fed into each D terminal (data input terminal) of the D-type flip flops 1405 and 1406. The decoder 701 switches the analog switch 702 (FIG. 7) as indicated in the following Table 4, based on output signals Y and Z respectively released from the D-type flip flops 1405 and 1406.

TABLE 4

| Z | Y | M |
|---|---|---|
| 0 | 0 | Vh/2 |
| 0 | 1 | V+ |
| 1 | 0 | V− |
| 1 | 1 | Vh/2 |

Figure 14:
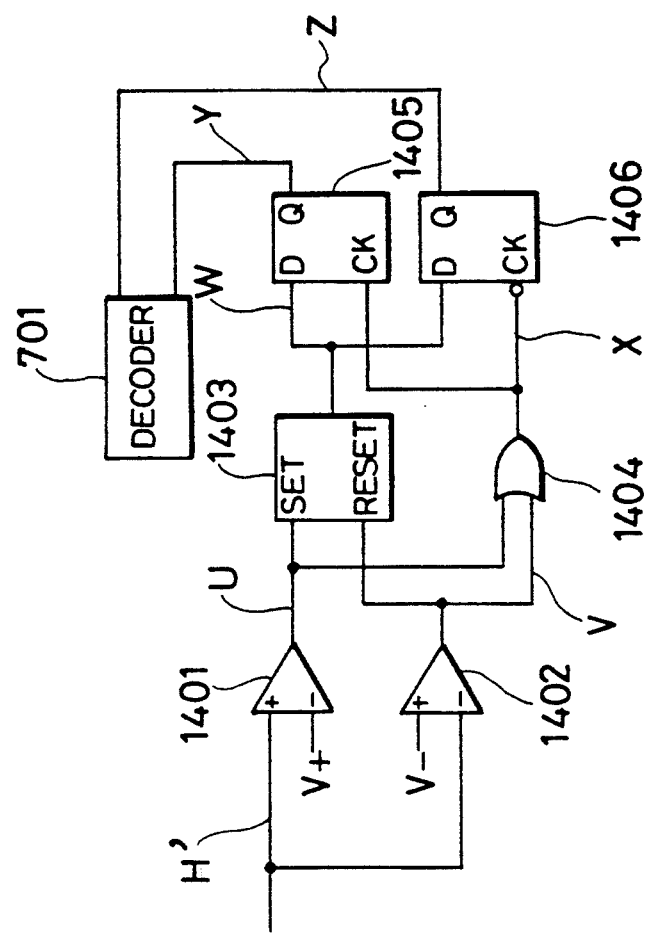
FIGS. 14 and 15 illustrate a sixth embodiment of the present invention.
Figure 15:
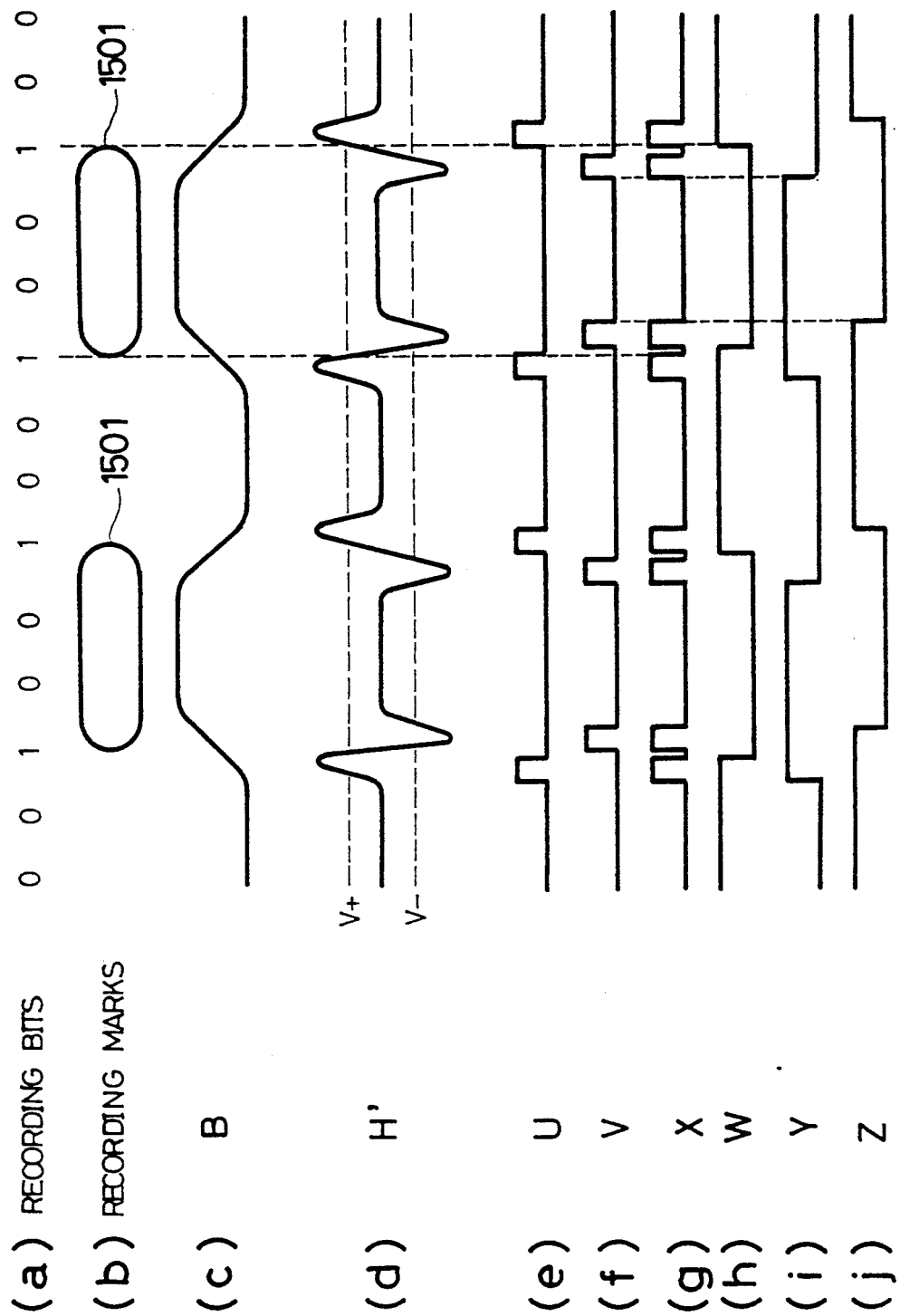
Figure 16:
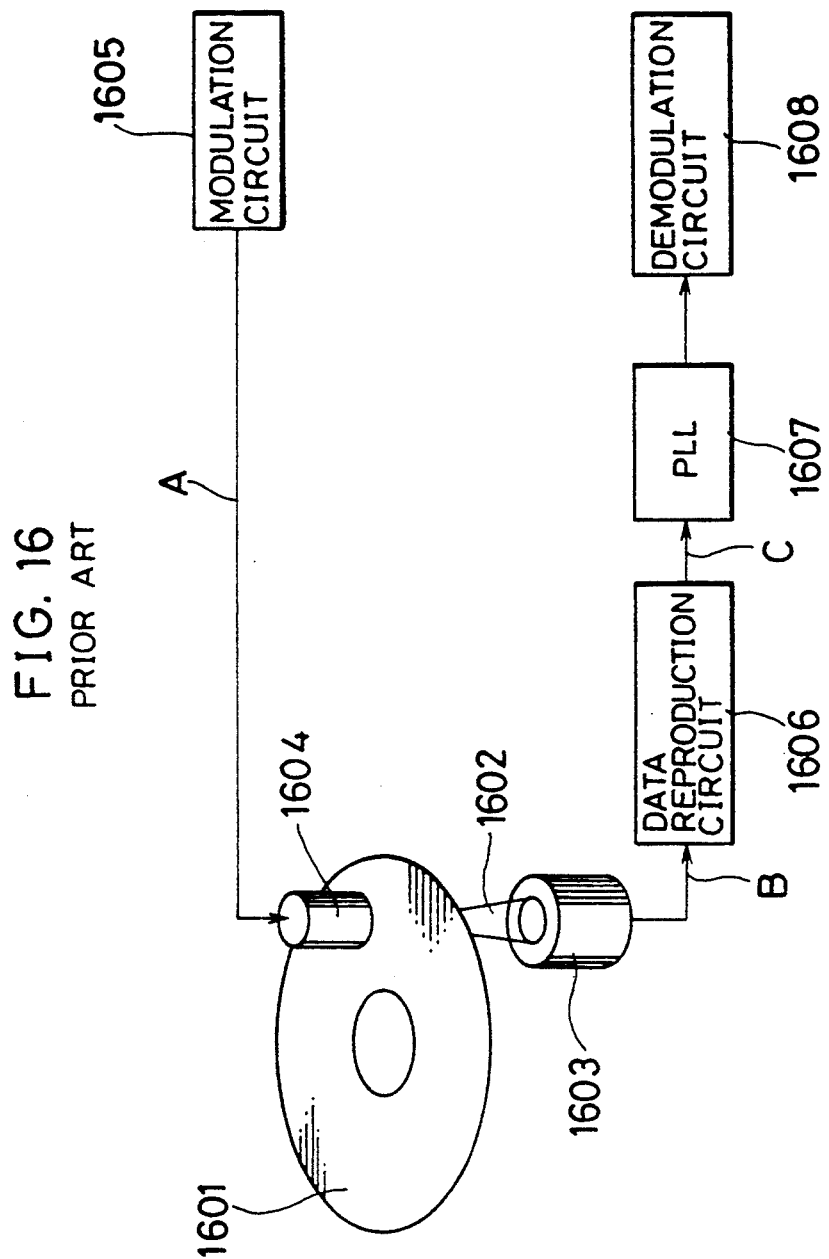
Figure 17:
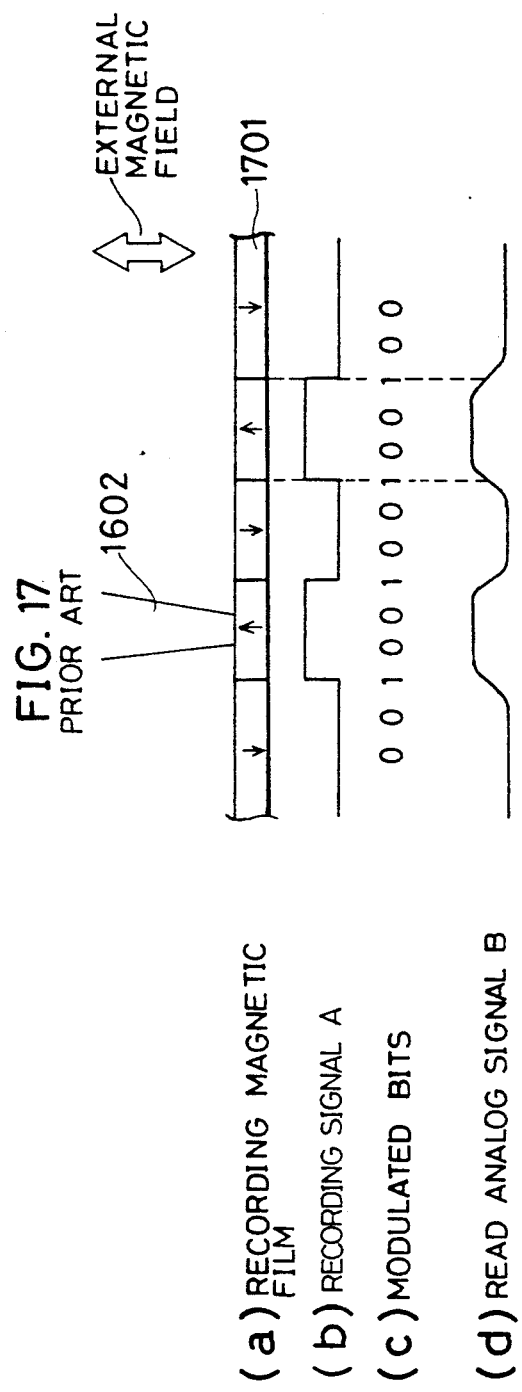
Figure 18:
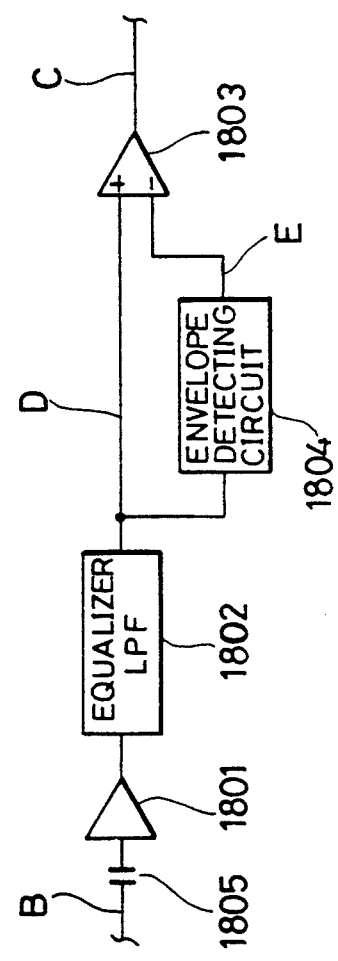

FIG. 15 illustrates waveforms produced in different sections of a data reproduction circuit shown in FIG. 14. Here also, recording marks 1501 as shown in FIG. 15(b) are recorded through the NRZI method in accordance with recording bits shown in FIG. 15(a). The recording marks 1501 are read to produce a read analog signal B as shown in FIG. 15(c)

The second order differentiated signal H' (FIG. 15(d)) is sliced by the comparative voltage $V_+$ in the comparator 1401 to produce the output signal U (FIG. 15(e)). The second order differentiated signal H, is sliced by the comparative voltage $V_-$ in the comparator 1402 to produce the output signal V (FIG. 15(f)). Based on the output signals U and V respectively released from the comparators 1401 and 1402, the OR gate 1404 releases the output signal X as shown in FIG. 15(g) and the flip flop 1403 releases the output signal W as shown in FIG. 15(h). As a result, the output signals Y and Z respectively released from the D-type flip flops 1405 and 1406 are as indicated in FIGS. 15(i) and (j). The comparative voltage M is switched to a plurality of levels in accordance with the output signals Y and Z as indicated above. The characteristic of the sixth embodiment lies in the fact that the reference adopted for switching the comparative voltage M is the second order differentiated signal H' itself. In other terms, edges may be detected by means of the sole second order differentiated signal H' and the use of a first order differentiated signal G' is not necessary.

A data reproduction circuit may be designed by suitably combining elements composing the circuits illustrated in the first to sixth embodiments. In addition, the comparative voltages M, $N_1$ and $N_2$ may be transmitted through a filter to undergo a smoothing process or other process.

Cases were discussed where the comparative voltages M, $N_1$ and $N_2$ are switched between two or three levels. However, these are not restrictive examples and the above comparative voltages may be switched between above four levels or may be changed in an analog manner (for example, the comparative voltage M may be emitted using an output of a D/A converter controlled through digital signal processing, etc.). Namely, provision should be made such that the zero-cross points of the comparative voltages M, $N_1$ and $N_2$ accurately coincides with leading and trailing edges or the peaks of the read analog signal B and that no zero-cross noise occurs at points other than the above. Also, the reference adopted for switching the comparative voltages M, $N_1$ and $N_2$ is not restricted to the first order differentiated signal G', and the second order differentiated signal H' or the analog reproduction signal O may be adopted as well.

The above embodiments showed that the present invention is particularly effective for optical recording-/reproduction apparatuses (recording/reproduction apparatus for magneto-optical disk, etc.). It goes without saying that the present invention may suitably be adopted for magnetic recording/reproduction apparatuses and other apparatuses.

The preferred embodiments described above are illustrative and not restrictive, the scope of the invention being indicated by the appended claims and all variations which come within the meanings of the claims are intended to be embraced herein.

What is claimed is:

1. A data reproduction circuit for converting a read analog signal read from a data recording medium into digital data corresponding to recording digital data, comprising:
   (a) first order differential means for emitting a first order differentiated signal derived from the read analog signal,
   (b) second order differential means for emitting a second order differentiated signal of the read analog signal derived from the read analog signal or said first order differentiated signal,
   (c) an edge detecting circuit for detecting and converting a leading edge and a trailing edge of the read analog signal into the digital data, and
   (d) a peak detecting circuit for detecting and converting a peak of the read analog signal into the digital data,
   said edge detecting circuit including
      (1) first comparative voltage generating means for generating a first comparative voltage that has a plurality of levels, and
      (2) first comparing means for comparing said second order differentiated signal and said first comparative voltage to generate first digital data; and said peak detecting circuit including
      (1) second comparative voltage generating means for generating a second comparative voltage that has a plurality of levels, and
      (2) second comparing means for comparing said first order differentiated signal and second comparative voltage to generate second digital data; and
   (e) means for switching said comparative voltage for obtaining said plurality of levels.

2. A data reproduction circuit comprising:
   a first differential circuit for emitting a first order differentiated signal derived from a read analog signal read from a data recording medium;
   a second differential circuit for emitting a second order differentiated signal derived from said first order differentiated signal;
   an edge detecting circuit for releasing a first comparative voltage, and comparing said second order differentiated signal and said first comparative voltage to release first digital data so that said first digital data can be used in an NRZ method; and
   a peak detecting circuit for releasing a second comparative voltage, and comparing said first order differentiated signal and said second digital data,
   wherein said peak detecting circuit comprises:
      a second comparator for comparing said first order differentiated signal and said second comparative voltage to release a second digital output signal; and
      two three-state inverters wherein an output signal released from said second comparator is fed to and that respectively release said second comparative voltage,
      wherein only one of said three-state inverters is opened in response to control signal respectively fed into each of said three-state inverters.

3. The data reproduction circuit as defined in claim 2 further comprising a monostable multivibrator wherein said second digital output signal is fed to, and that releases a pulse representing a fall of said second digital output signal, said pulse constituting said second digital data.

4. The data reproduction circuit as defined in claim 2, wherein:
   (a) said edge detecting circuit includes
      (1) a first comparator for comparing said second order differentiated signal and said first comparative voltage to release a first digital output signal; and
      (2) an inverter wherein an output signal released from said first comparator is fed to and that releases said first comparative voltage, and
   (b) an output signal released from said second comparator is fed as said first comparative voltage into said first comparator.

5. The data reproduction circuit as defined in claim 4 further comprising a bistable multivibrator wherein said first digital output signal is fed to, and that releases a pulse representing a fall and a rise of said first digital output signal, said pulse constituting said first digital data.

6. The data reproduction circuit as defined in claim 2, wherein said peak detecting circuit includes:
   a second comparator for comparing said first order differentiated signal and said second comparative voltage to release a second digital output signal;
   an inverter wherein an output signal released from said second comparator is fed to, and that generates said second comparative voltage; and
   a monostable multivibrator wherein said second digital output signal is fed to, and that releases a pulse representing a fall of said second digital output signal, said pulse constituting said second digital data.

7. The data reproduction circuit as defined in claim 2, wherein said edge detecting circuit includes:
   second digital signal outputting means for emitting a second digital output signal derived from said first order differentiated signal;
   an exclusive OR circuit wherein said second digital output signal released from said second digital signal outputting means and a first digital output signal are fed to;

a first comparator for comparing said second order differentiated signal and said first comparative voltage to release said first digital output signal;

three-state inverter wherein said first digital output signal and an output signal released from said exclusive OR circuit are fed to, and that releases said first comparative voltage; and a bistable multivibrator wherein said first digital output signal is fed to, and that releases a pulse representing a fall and a rise of said first digital output signal, said pulse constituting said first digital data.

8. The data reproduction circuit as defined in claim 7, wherein said second digital signal outputting means includes:

a second comparator for comparing said first differentiated signal and said first comparative voltage to release said second digital output signal; and an inverter wherein said second digital output signal released from said second comparator is fed to, and that generates said first comparative voltage.

9. The data reproduction circuit as defined in claim 7 wherein said second digital signal outputting means includes:

two comparators, said first order differentiated signal being fed into each of said two comparators; and a flip flop wherein output signals respectively released from said comparators are fed to, and that releases said second digital output signal.

10. The data reproduction circuit as defined in claim 2, wherein said edge detecting circuit includes:

a comparator for comparing said second differentiated signal and said first comparative voltage to release a first digital output signal;

changeover control means for releasing a signal to switch an analog switch;

said analog switch having switches that are changed in response to an output signal released from said changeover control means so that said first comparative voltage having a plurality of levels is fed into said comparator; and a bistable multivibrator wherein said first digital output signal is fed to, and that releases a pulse representing a fall and a rise of said first digital output signal, said pulse constituting said first digital data.

11. The data reproduction circuit as defined in claim 10, wherein said changeover control means includes a decoder wherein a second digital output signal and said first digital output signal are fed to.

12. The data reproduction circuit as defined in claim 10, wherein said changeover control means includes:

two comparators, said first order differentiated signal being fed into each of said two comparators;

a flip flop wherein output signals respectively released from said comparators are fed to, and that releases a second digital output signal;

an OR gate wherein said output signals respectively released from said comparators are fed to; and a decoder wherein said second digital output signal and an output signal released from said OR gate are fed to, and that releases a signal for switching an analog switch.

13. The data reproduction circuit as defined in claim 10, wherein said changeover control means includes:

two comparators, said second order differentiated signal being fed to each of said comparators;

an OR gate wherein output signals respectively released from said comparators are fed to;

a flip flop wherein output signals respectively released from said comparators are fed to;

two D-type flip flops, an output signal released from said OR gate and an output signal released from said flip flop being fed into each of said D-type flip flops; and a decoder wherein output signals respectively released from said D-type flip flops are fed to, and that releases a signal for switching an analog signal.

14. The data reproduction circuit as defined in claim 2, wherein said edge detecting circuit includes:

a first comparator for comparing said second differentiated signal and said first comparative voltage to release a first digital output signal;

an inverter wherein said first digital output signal is fed to, and that releases said first comparative voltage;

a clamping circuit where a reproduction signal is clamped at a predetermined level;

two comparators, an output signal released from said clamping circuit being fed into each of said comparators;

a logic circuit wherein output signals respectively released from said comparators are fed to, and that releases a second digital output signal to be fed into said first comparator; and a bistable multivibrator wherein said first digital output signal is fed to, and that releases a pulse representing a fall and a rise of said first digital output signal, said pulse constituting said first digital data.

* * * * *

UNITED STATES PATENT AND TRADEMARK OFFICE
CERTIFICATE OF CORRECTION

PATENT NO. : 5,311,493

DATED : May 10, 1994

INVENTOR(S) : Fuji

It is certified that error appears in the above-identified patent and that said Letters Patent is hereby corrected as shown below:

Column 18, line 1, claim 6, delete "The data reproduction circuit as defined in claim 2," and insert in its place --A data reproduction circuit comprising:

a first differential circuit for emitting a first order differentiated signal derived from a read analog signal read from a data recording medium;

a second differential circuit for emitting a second order differentiated signal derived from said first order differentiated signal;

an edge detecting circuit for releasing a first comparative voltage, and comparing said second order differentiated signal and said first comparative voltage to release first digital data so that said first digital data can be used in an NRZI method;

a peak detecting circuit for releasing a second comparative voltage, and comparing said first order differentiated signal and said second comparative voltage to release second digital data so that said second digital data can be used in an RZ method;--

UNITED STATES PATENT AND TRADEMARK OFFICE
CERTIFICATE OF CORRECTION

PATENT NO. : 5,311,493
DATED : May 10, 1994
INVENTOR(S) : Fuji

It is certified that error appears in the above-identified patent and that said Letters Patent is hereby corrected as shown below:

Column 18, line 1, claim 7, delete "The data reproduction circuit as defined in claim 2," and insert in its place --A data reproduction circuit comprising:

a first differential circuit for emitting a first order differentiated signal derived from a read analog signal read from a data recording medium;

a second differential circuit for emitting a second order differentiated signal derived from said first order differentiated signal;

an edge detecting circuit for releasing a first comparative voltage, and comparing said second order differentiated signal and said first comparative voltage to release first digital data so that said first digital data can be used in an NRZI method;

a peak detecting circuit for releasing a second comparative voltage, and comparing said first order differentiated signal and said second comparative voltage to release second digital data so that said second digital data can be used in an RZ method;--

UNITED STATES PATENT AND TRADEMARK OFFICE
CERTIFICATE OF CORRECTION

PATENT NO. : 5,311,493
DATED : May 10, 1994
INVENTOR(S) : Fuji

It is certified that error appears in the above-indentified patent and that said Letters Patent is hereby corrected as shown below:

Column 19, line 1, claim 10, delete "The data reproduction circuit as defined in claim"

Line 2, delete "2," and insert in its place --A data reproduction circuit comprising:

a first differential circuit for emitting a first order differentiated signal derived from a read analog signal read from a data recording medium;

a second differential circuit for emitting a second order differentiated signal derived from said first order differentiated signal;

an edge detecting circuit for releasing a first comparative voltage, and comparing said second order differentiated signal and said first comparative voltage to release first digital data so that said first digital data can be used in an NRZI method;

a peak detecting circuit for releasing a second comparative voltage, and comparing said first order differentiated signal and said second comparative voltage to release second digital data so that said second digital data can be used in an RZ method;--

UNITED STATES PATENT AND TRADEMARK OFFICE
CERTIFICATE OF CORRECTION

PATENT NO. : 5,311,493
DATED : May 10, 1994
INVENTOR(S) : Fuji

It is certified that error appears in the above-indentified patent and that said Letters Patent is hereby corrected as shown below:

Column 20, line 1, claim 14, delete "The data reproduction circuit as defined in claim"

Line 2, delete "2," and insert in its place --A data reproduction circuit comprising:

a first differential circuit for emitting a first order differentiated signal derived from a read analog signal read from a data recording medium;

a second differential circuit for emitting a second order differentiated signal derived from said first order differentiated signal;

UNITED STATES PATENT AND TRADEMARK OFFICE
CERTIFICATE OF CORRECTION

PATENT NO. : 5,311,493
DATED : May 10, 1994
INVENTOR(S) : Fuji

It is certified that error appears in the above-indentified patent and that said Letters Patent is hereby corrected as shown below:

Column 20, line 1, claim 14, an edge detecting circuit for releasing a first comparative voltage, and comparing said second order differentiated signal and said first comparative voltage to release first digital data so that said first digital data can be used in an NRZI method;

a peak detecting circuit for releasing a second comparative voltage, and comparing said first order differentiated signal and said second comparative voltage to release second digital data so that said second digital data can be used in an RZ method; --.

Signed and Sealed this

Thirty-first Day of January, 1995

Attest:

BRUCE LEHMAN

Attesting Officer

Commissioner of Patents and Trademarks